US011114119B1

(12) United States Patent
Sasaki et al.

(10) Patent No.: US 11,114,119 B1
(45) Date of Patent: Sep. 7, 2021

(54) THERMALLY-ASSISTED MAGNETIC RECORDING HEAD INCLUDING A MAIN POLE AND A PLASMON GENERATOR

(71) Applicants: Yoshitaka Sasaki, Los Gatos, CA (US);
Hiroyuki Ito, Milpitas, CA (US);
Shigeki Tanemura, Milpitas, CA (US);
Seiichiro Tomita, Milpitas, CA (US)

(72) Inventors: Yoshitaka Sasaki, Los Gatos, CA (US);
Hiroyuki Ito, Milpitas, CA (US);
Shigeki Tanemura, Milpitas, CA (US);
Seiichiro Tomita, Milpitas, CA (US)

(73) Assignee: HEADWAY TECHNOLOGIES, INC., Milpitas, CA (US)

( * ) Notice: Subject to any disclaimer, the term of this patent is extended or adjusted under 35 U.S.C. 154(b) by 0 days.

(21) Appl. No.: 17/062,149

(22) Filed: Oct. 2, 2020

(51) Int. Cl.
*G11B 5/00* (2006.01)
*G11B 5/48* (2006.01)
*G11B 5/60* (2006.01)
*G11B 5/31* (2006.01)
*G11B 5/40* (2006.01)

(52) U.S. Cl.
CPC .......... *G11B 5/4866* (2013.01); *G11B 5/3106* (2013.01); *G11B 5/40* (2013.01); *G11B 5/6088* (2013.01); *G11B 2005/0021* (2013.01)

(58) Field of Classification Search
CPC ....... G11B 7/1387; G11B 5/17; G11B 5/4866; G11B 5/1272; G11B 2005/0021; G11B 13/04; G11B 5/3116; G11B 5/012; G11B 5/1278; G11B 5/314; G11B 5/6088; G11B 5/127; G11B 11/10; G11B 11/105; G11B 5/00
USPC ................ 360/59, 125.31, 313, 328, 125.74; 369/13.02, 13.12
See application file for complete search history.

(56) References Cited

U.S. PATENT DOCUMENTS

| 8,705,327 | B2 | 4/2014 | Matsumoto |
| 8,760,809 | B1 | 6/2014 | Sasaki et al. |
| 8,848,494 | B2* | 9/2014 | Sasaki .................... G11B 5/314 369/13.33 |
| 9,472,230 | B1 | 10/2016 | Sasaki et al. |
| 9,741,377 | B1 | 8/2017 | Sasaki et al. |

\* cited by examiner

*Primary Examiner* — Nabil Z Hindi
(74) *Attorney, Agent, or Firm* — Oliff PLC

(57) ABSTRACT

A thermally-assisted magnetic recording head includes a medium facing surface, a main pole, a waveguide, and a plasmon generator. The plasmon generator includes a first metal layer and a second metal layer. The first metal layer includes a plasmon exciting portion on which surface plasmons are excited. The second metal layer is located on the first metal layer, and includes a bottom surface in contact with the first metal layer, a top surface located on a side opposite to the bottom surface, a front end face that is located in the medium facing surface and generates near-field light from the surface plasmons, and a connecting surface that connects the top surface and the front end face. The connecting surface includes an inclined portion inclined relative to a direction perpendicular to the medium facing surface.

11 Claims, 26 Drawing Sheets

THERMALLY-ASSISTED MAGNETIC RECORDING HEAD INCLUDING A MAIN POLE AND A PLASMON GENERATOR

BACKGROUND OF THE INVENTION

1. Field of the Invention

The present invention relates to a thermally-assisted magnetic recording head for use in thermally-assisted magnetic recording to write data on a recording medium with the coercivity thereof lowered by applying near-field light thereto.

2. Description of the Related Art

With recent increases in recording density of magnetic recording devices such as magnetic disk drives, there has been demand for improved performance of thin-film magnetic heads and recording media. Among the thin-film magnetic heads, a composite thin-film magnetic head has been used widely. The composite thin-film magnetic head has such a structure that a read head unit including a magnetoresistive element (hereinafter, also referred to as MR element) for reading and a recording head unit including an induction-type electromagnetic transducer for writing are stacked on a substrate. In a magnetic disk drive, the thin-film magnetic head is mounted on a slider configured to slightly fly above the surface of a recording medium. The slider has a medium facing surface configured to face the recording medium.

To increase the recording density of a magnetic recording device, it is effective to make the magnetic fine particles of the recording medium smaller. Making the magnetic fine particles smaller, however, disadvantageously lowers the thermal stability of magnetization of the magnetic fine particles. To overcome this problem, it is effective to increase the anisotropic energy of the magnetic fine particles. However, increasing the anisotropic energy of the magnetic fine particles leads to an increase in coercivity of the recording medium, thereby making it difficult to perform data writing with existing magnetic heads.

As a solution to the problems described above, there has been proposed a technology called thermally-assisted magnetic recording. The technology uses a recording medium having high coercivity. When writing data, a write magnetic field and heat are applied almost simultaneously to the area of the recording medium where to write data, so that the area rises in temperature and drops in coercivity for data writing. The area where data is written subsequently falls in temperature and rises in coercivity to increase in thermal stability of magnetization. Hereinafter, a magnetic head for use in thermally-assisted magnetic recording will be referred to as a thermally-assisted magnetic recording head.

In thermally-assisted magnetic recording, near-field light is typically used as a means for applying heat to the recording medium. A known method for generating near-field light is to use a plasmon generator, which is a piece of metal that generates near-field light from plasmons excited by irradiation with laser light. The laser light to be used for generating near-field light is typically emitted from a laser diode mounted on the slider, and is guided, by a waveguide provided in the slider, to the plasmon generator disposed near the medium facing surface of the slider.

U.S. Pat. Nos. 8,760,809 B1 and 9,741,377 B2 each disclose a thermally-assisted magnetic recording head including a main pole, a waveguide, and a plasmon generator. The main pole has an end face located in the medium facing surface, and produces a write magnetic field from this end face. The plasmon generator has an end face located in the medium facing surface. The waveguide includes a core and a cladding. In this head, the surface of the core and the surface of the plasmon generator face each other with a gap interposed therebetween. This head is configured to excite surface plasmons on the plasmon generator by using evanescent light that is generated at the surface of the core from the light propagating through the core, and to generate near-field light from the excited surface plasmons at the end face of the plasmon generator.

To increase the recording density, the width and thickness of the plasmon generator in the medium facing surface need to be reduced.

In a thermally-assisted magnetic recording head, heat generated by the plasmon generator causes the plasmon generator to get hot. This results in the problem of deformation or breakage of the plasmon generator, thus shortening the life of the thermally-assisted magnetic recording head. In particular, such a problem becomes pronounced as the width and thickness of the plasmon generator in the medium facing surface decrease.

One of solutions to the aforementioned problem is to construct the plasmon generator to include a first metal portion and a second metal portion that are formed of mutually different metal materials, as disclosed in U.S. Pat. No. 9,754,614 B1. The first metal portion has a front end that is closest to the medium facing surface and is located at a distance from the medium facing surface. The second metal portion has an end face located in the medium facing surface. The first metal portion further has a plasmon exciting section to excite surface plasmons thereon. The surface plasmons excited on the plasmon exciting section propagate to the end face of the second metal portion located in the medium facing surface, and near-field light is generated from those excited surface plasmons at the end face of the second metal portion.

A metal suitable for excitation and propagation of surface plasmons, that is, a metal having high electrical conductivity such as Au or Ag is selected as the metal material to form the first metal portion. As the metal material to form the second metal portion, selected is one having higher hardness than the metal material used for the first metal portion. This can prevent the second metal portion from being deformed or broken.

However, the plasmon generator including the aforementioned first and second metal portions has a problem in that the heat generated at the second metal portion is transferred to the first metal portion to cause the first metal portion to get hot, and can thus deform the first metal portion such that its front end gets farther from the medium facing surface.

In the plasmon generator disclosed in FIG. 1 and the like of U.S. Pat. No. 9,754,614 B1, the part of the first metal portion including the plasmon exciting section is located on the bottom surface side of the second metal portion. In this plasmon generator, the second metal portion is tapered on the bottom surface side. In such a case, in a microscopic view of the second metal portion, the part of the second metal portion on the bottom surface side has small heat capacity and tends to increase in temperature. This makes the part of the first metal portion including the plasmon exciting section even higher in temperature.

SUMMARY OF THE INVENTION

An object of the present invention is to provide a thermally-assisted magnetic recording head including a highly-reliable plasmon generator.

A thermally-assisted magnetic recording head according to the present invention includes a medium facing surface that faces a recording medium, a main pole that generates a write magnetic field for writing data on the recording medium, a waveguide including a core that propagates light and a cladding that is located around the core, and a plasmon generator. The plasmon generator includes a first metal layer and a second metal layer. The first metal layer is formed of a first metal material, is located away from the medium facing surface, and includes a plasmon exciting portion on which a surface plasmon is excited on the basis of the light propagating through the core.

The second metal layer is formed of a second metal material, is located on the first metal layer, and includes a bottom surface in contact with the first metal layer, a top surface located on a side opposite to the bottom surface, a front end face that is located in the medium facing surface and generates near-field light from the surface plasmon, and a connecting surface that connects the top surface and the front end face. The connecting surface includes an inclined portion inclined relative to a direction perpendicular to the medium facing surface.

In the thermally-assisted magnetic recording head according to the present invention, the core may include an evanescent light generating surface that generates evanescent light from the light propagating through the core. The plasmon exciting portion may be opposed to the evanescent light generating surface at a predetermined distance. In the first metal layer, the surface plasmon may be excited on the plasmon exciting portion through coupling with the evanescent light.

In the thermally-assisted magnetic recording head according to the present invention, the second metal layer includes a narrow portion including the front end face of the second metal layer, and a wide portion located farther from the medium facing surface than the narrow portion is. The wide portion may have a maximum width greater than a maximum width of the narrow portion in a track width direction.

The thermally-assisted magnetic recording head according to the present invention may further include a heat sink in contact with the top surface of the second metal layer at a position away from the medium facing surface. The heat sink may include an inclined surface inclined relative to the direction perpendicular to the medium facing surface, the inclined surface being continuous with the inclined portion of the connecting surface of the second metal layer. An angle that the inclined surface of the heat sink forms with the direction perpendicular to the medium facing surface may be the same as an angle that the inclined portion of the connecting surface of the second metal layer forms with the direction perpendicular to the medium facing surface.

If the thermally-assisted magnetic recording head according to the present invention includes the heat sink, the first metal layer may include a first end closest to the medium facing surface. The inclined surface may include a second end closest to the medium facing surface. A distance from the medium facing surface to the second end of the inclined surface may be less than or equal to a distance from the medium facing surface to the first end of the first metal layer.

A manufacturing method for a thermally-assisted magnetic recording head according to the present invention includes a step of forming the main pole, a step of forming the waveguide, and a step of forming the plasmon generator. The step of forming the plasmon generator includes a step of forming the first metal layer and a step of forming the second metal layer. The step of forming the second metal layer includes a step of forming a metal film of the second metal material and a first etching step of taper etching the metal film so that the inclined portion of the connecting surface of the second metal layer is formed in the metal film.

The thermally-assisted magnetic recording head manufactured by the manufacturing method according to the present invention may further include a heat sink in contact with the top surface of the second metal layer at a position away from the medium facing surface. In such a case, the manufacturing method for a thermally-assisted magnetic recording head according to the present invention further includes a step of forming the heat sink. The heat sink may include an inclined surface inclined relative to the direction perpendicular to the medium facing surface. In such a case, the step of forming the heat sink may include a step of forming an initial heat sink for eventually making the heat sink on the metal film, and a second etching step of taper etching the initial heat sink so that the inclined surface of the heat sink is formed on the initial heat sink. The first etching step may be performed continuously after the second etching step. In such a case, the first and second etching steps may be performed by using ion beam etching.

According to the thermally-assisted magnetic recording head of the present invention, deformation of the first metal layer can be suppressed. As a result, the reliability of the plasmon generator can be improved.

Other and further objects, features and advantages of the present invention will appear more fully from the following description.

DETAILED DESCRIPTION OF THE PREFERRED EMBODIMENTS

First Embodiment

Figure 3:
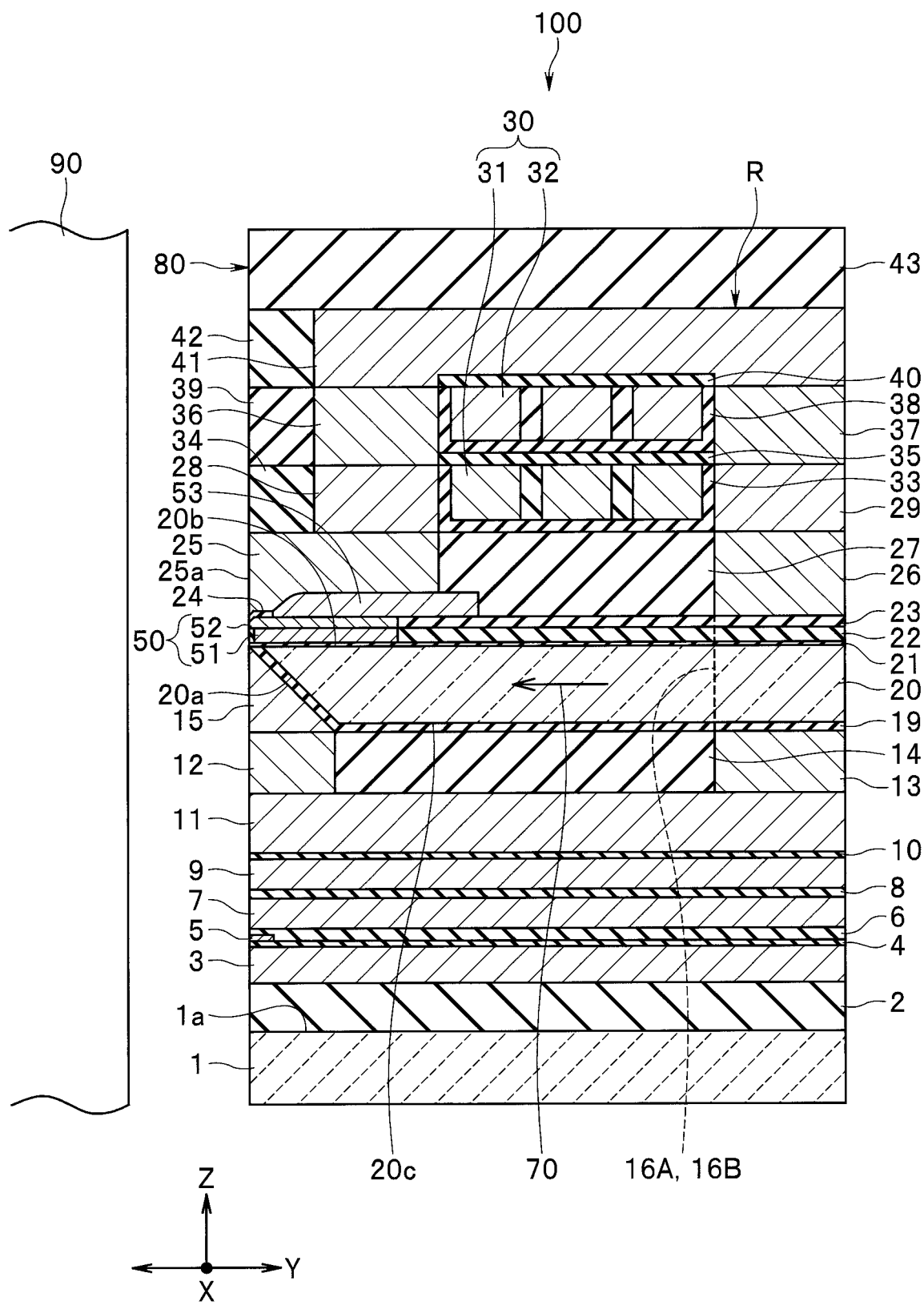
FIG. 3 is a cross-sectional view showing the configuration of the thermally-assisted magnetic recording head according to the first embodiment of the invention.
Figure 4:
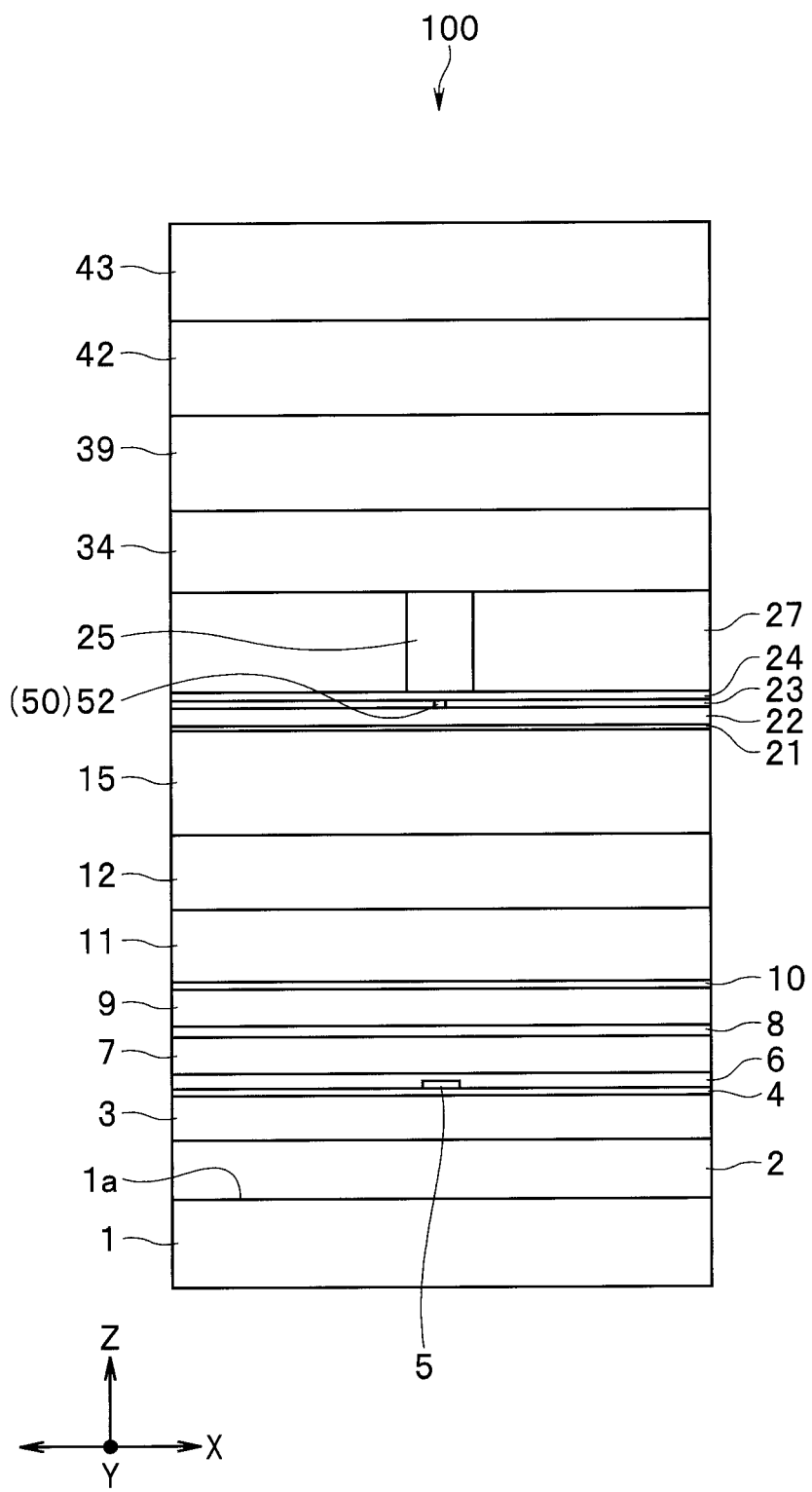
FIG. 4 is a front view showing the medium facing surface of the thermally-assisted magnetic recording head according to the first embodiment of the invention.

Preferred embodiments of the present invention will now be described in detail with reference to the drawings. First, reference is made to FIG. 3 and FIG. 4 to describe the configuration of a thermally-assisted magnetic recording head according to a first embodiment of the invention. FIG. 3 is a cross-sectional view showing the configuration of the thermally-assisted magnetic recording head. FIG. 4 is a front view showing the medium facing surface of the thermally-assisted magnetic recording head.

The thermally-assisted magnetic recording head 100 according to the present embodiment is intended for use in perpendicular magnetic recording, and is incorporated in a slider configured to fly over the surface of a rotating recording medium. The slider has a medium facing surface 80 configured to face a recording medium 90. When the recording medium 90 rotates, an airflow passing between the recording medium 90 and the slider causes a lift to be exerted on the slider. The lift causes the slider to fly over the surface of the recording medium 90.

As shown in FIG. 3, the thermally-assisted magnetic recording head 100 has the medium facing surface 80. Here, we define X direction, Y direction, and Z direction as follows. The X direction corresponds to the direction of track width of the recording medium 90. The Y direction is a direction perpendicular to the medium facing surface 80. The Z direction corresponds to the direction of track length of the recording medium 90, and is the direction of travel of the recording medium 90 as viewed from the slider. The X, Y, and Z directions are orthogonal to one another.

As shown in FIG. 3 and FIG. 4, the thermally-assisted magnetic recording head 100 includes: a substrate 1 formed of a ceramic material such as aluminum oxide-titanium carbide ($Al_2O_3$—TiC) and having a top surface 1a; an insulating layer 2 formed of an insulating material such as alumina ($Al_2O_3$) and disposed on the top surface 1a of the substrate 1; a bottom shield layer 3 formed of a magnetic material and disposed on the insulating layer 2; a bottom shield gap film 4 which is an insulating film disposed to cover the bottom shield layer 3; a magnetoresistive (MR) element 5 serving as a read element disposed on the bottom shield gap film 4; two leads (not shown) connected to the MR element 5; a top shield gap film 6 which is an insulating film disposed on the MR element 5; and a top shield layer 7 formed of a magnetic material and disposed on the top shield gap film 6. The Z direction is also a direction perpendicular to the top surface 1a of the substrate 1.

For the positions of components of the thermally-assisted magnetic recording head 100, the term "above" as used herein refers to positions located in a direction that is parallel to the Z direction and away from the top surface 1a with respect to a reference position, and "below" refers to positions located in a direction that is parallel to the Z direction and toward the top surface 1a with respect to the reference position. For the surfaces of the components of the thermally-assisted magnetic recording head 100, the term "top surface" as used herein refers to the surface farthest from the top surface 1a, and "bottom surface" refers to the surface closest to the top surface 1a.

An end of the MR element 5 is located in the medium facing surface 80. The MR element 5 may be an element formed of a magneto-sensitive film that exhibits a magnetoresistive effect, such as an anisotropic magnetoresistive (AMR) element, a giant magnetoresistive (GMR) element, or a tunneling magnetoresistive (TMR) element. The GMR element may be of either the current-in-plane (CIP) type in which a current for use in magnetic signal detection is fed in a direction generally parallel to the plane of layers constituting the GMR element or the current-perpendicular-to-plane (CPP) type in which the current for use in magnetic signal detection is fed in a direction generally perpendicular to the plane of the layers constituting the GMR element.

The parts from the bottom shield layer 3 to the top shield layer 7 constitute a read head unit. The thermally-assisted magnetic recording head 100 further includes an insulating layer 8 disposed on the top shield layer 7, a middle shield layer 9 formed of a magnetic material and disposed on the insulating layer 8, a nonmagnetic layer 10 formed of a nonmagnetic material and disposed on the middle shield layer 9, and a recording head unit disposed on the nonmagnetic layer 10. The middle shield layer 9 has the function of shielding the MR element 5 from magnetic fields generated in the recording head unit. The insulating layer 8 and the nonmagnetic layer 10 are formed of alumina, for example.

The recording head unit includes a coil 30 and a main pole 25. The coil 30 produces a magnetic field corresponding to data to be written on the recording medium 90. As shown in FIG. 3, the main pole 25 has a front end face 25a located in the medium facing surface 80. The main pole 25 is configured to pass a magnetic flux corresponding to the magnetic field produced by the coil 30, and to produce from the front end face 25a a write magnetic field for use to write data on the recording medium 90 by means of a perpendicular magnetic recording system. The coil 30 is formed of a conductive material such as copper. The main pole 25 is formed of a magnetic material.

The recording head unit further includes a shield 15. The shield 15 is formed of a magnetic metal. The shield 15 has an end face located in the medium facing surface 80.

The recording head unit further includes a return path section R formed of a magnetic material. The return path section R connects the main pole 25 and the shield 15 to each other, and passes a magnetic flux corresponding to the magnetic field produced by the coil 30. The return path section R includes a return pole layer 11, coupling layers 12, 13, 26, 28, 29, 36 and 37, two coupling sections 16A and 16B, and a yoke layer 41. The return pole layer 11 lies on the nonmagnetic layer 10. The return pole layer 11 has an end face located in the medium facing surface 80. The recording head unit further includes an unshown insulating layer provided around the return pole layer 11. The unshown insulating layer is formed of alumina, for example.

The coupling layer 12 lies on a first portion of the top surface of the return pole layer 11, the first portion being near the medium facing surface 80. The coupling layer 13 lies on a second portion of the top surface of the return pole layer 11, the second portion being located away from the medium facing surface 80. The coupling layer 12 has an end face located in the medium facing surface 80. The recording head unit further includes an insulating layer 14 lying on the unshown insulating layer and a portion of the top surface of the return pole layer 11 other than the first and second portions. The insulating layer 14 is formed of alumina, for example.

The shield 15 is disposed on the coupling layer 12. The coupling sections 16A and 16B are disposed on the coupling layer 13. Each of the coupling sections 16A and 16B includes a first layer lying on the coupling layer 13, and a second layer lying on the first layer. The first layer of the coupling section 16A and the first layer of the coupling section 16B are aligned in the direction of track width (the X direction).

The recording head unit further includes a waveguide including a core 20 and a cladding, the core 20 allowing light to propagate therethrough, the cladding being provided around the core 20. The core 20 has an end face 20a facing toward the medium facing surface 80, an evanescent light generating surface 20b which is a top surface, a bottom surface 20c, and two side surfaces. The end face 20a is inclined such that the distance between the medium facing surface 80 and the end face 20a decreases with increasing distance between the end face 20a and the top surface 1a of the substrate 1.

The cladding includes cladding layers 19, 21, and 22, and a surrounding cladding layer (not shown). The cladding layer 19 lies on the shield 15, the coupling layer 13, and the insulating layer 14. The core 20 lies on the cladding layer 19. The surrounding cladding layer lies on the cladding layer 19 and surrounds the core 20. The cladding layer 21 lies on the evanescent light generating surface 20b of the core 20 and the top surface of the surrounding cladding layer.

The core 20 is formed of a dielectric material that transmits laser light to be used for generating near-field light. The laser light emitted from an unshown laser diode enters the core 20 and propagates through the core 20. The cladding is formed of a dielectric material that has a refractive index lower than that of the core 20. Examples of the material of the core 20 include tantalum oxide ($TaO_x$) and niobium oxide ($NbO_x$). Here, x represents an arbitrary number greater than 0. Examples of the material of the cladding include silicon oxide ($SiO_2$) and alumina.

The first layers of the coupling sections 16A and 16B are embedded in the cladding layer 19 and the surrounding cladding layer. The first layer of the coupling section 16A and the first layer of the coupling section 16B are located on opposite sides of the core 20 in the direction of track width (the X direction) and spaced from the core 20.

The recording head unit further includes a plasmon generator 50. The plasmon generator 50 is configured to excite surface plasmons thereon on the principle to be described later. As will be described in detail later, the plasmon generator 50 includes a first metal layer 51 and a second metal layer 52. The first metal layer 51 is located away from the medium facing surface 80. The second metal layer 52 has a front end face located in the medium facing surface 80. The first and second metal layers 51 and 52 are configured so that surface plasmons are excited from the light propagating through the core 20 and near-field light is generated at the front end face of the second metal layer 52 from the surface plasmons.

The first metal layer 51 is located on the cladding layer 21. The cladding layer 22 is located on the cladding layer 21, around the first metal layer 51. The second metal layer 52 is located on the first metal layer 51 and the cladding layer 22.

The recording head unit further includes a dielectric layer 23, a dielectric layer 24, and a heat sink 53. The dielectric layer 23 is located on the cladding layer 22, around the second metal layer 52. The dielectric layer 24 is located on the second metal layer 52 and the dielectric layer 23 near the medium facing surface 80. The heat sink 53 is located on the second metal layer 52 and the dielectric layer 23 at a distance from the medium facing surface 80. The heat sink 53 is formed of one of Au, Cu, Ag, and Al, for example. The dielectric layer 23 is formed of the same material as the cladding, for example. The dielectric layer 24 is formed of silicon oxide, for example.

Figure 2:
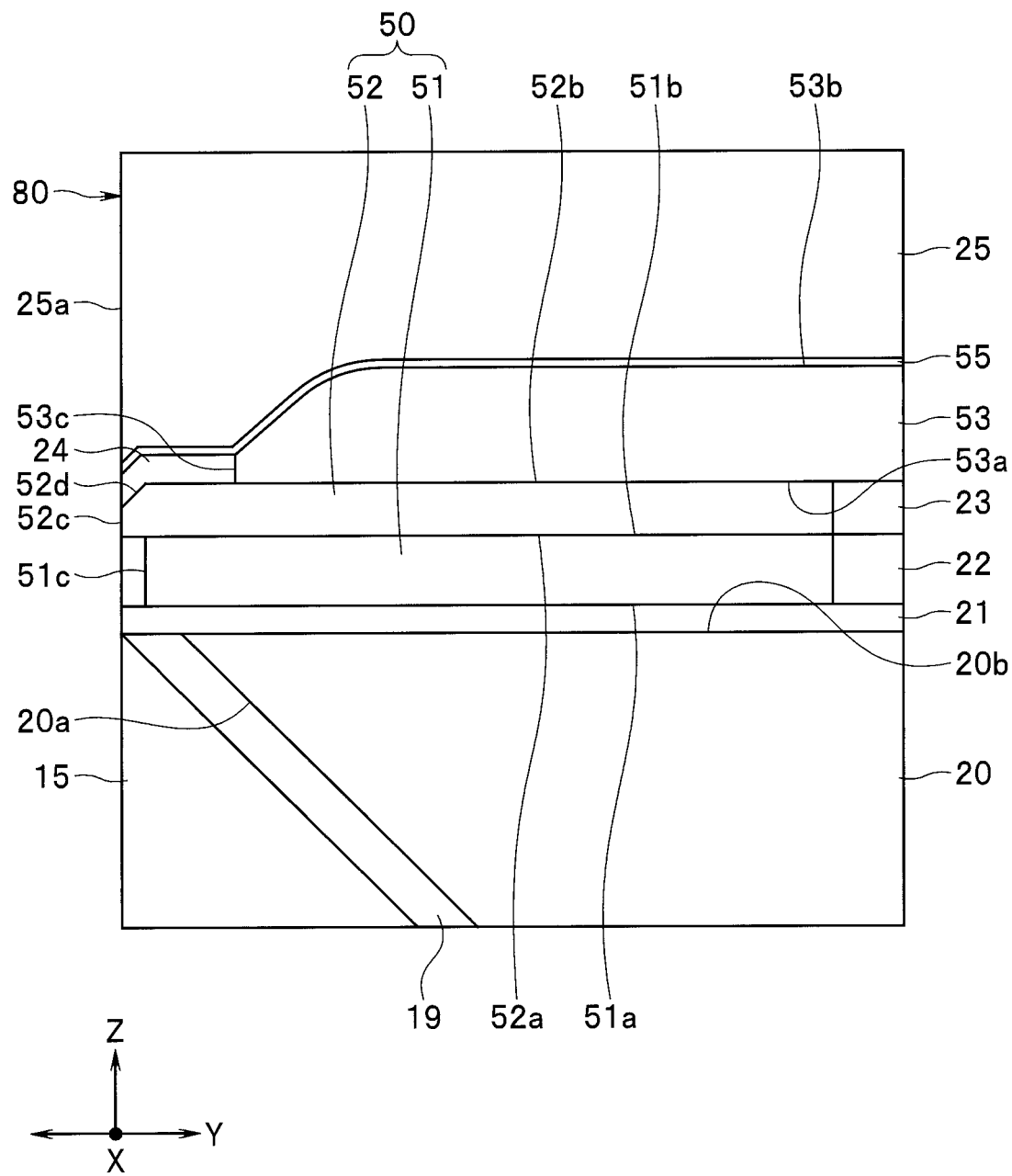
FIG. 2 is a cross-sectional view showing essential parts of a thermally-assisted magnetic recording head according to the first embodiment of the invention.

The main pole 25 is located on the heat sink 53 and the dielectric layer 24. The recording head unit further includes a separating film 55 interposed between the main pole 25 and the heat sink 53. The separating film 55 is shown in FIG. 2 to be described below. The separating film 55 has the function of preventing the material of the heat sink 53 from diffusing into the main pole 25. The separating film 55 is formed of Ru, Cr, Zr, Ti or Ta, for example. The separating film 55 is not an indispensable component of the thermally-assisted magnetic recording head 100, and may be omitted.

The second layers of the coupling sections 16A and 16B are embedded in the cladding layers 21 and 22 and the dielectric layer 23. The coupling layer 26 lies on the second layers of the coupling sections 16A and 16B and the dielectric layer 23. The recording head unit further includes a dielectric layer 27 located around the main pole 25 and the coupling layer 26. The dielectric layer 27 is formed of the same material as the cladding, for example.

The coupling layer 28 lies on the main pole 25. The coupling layer 28 has an end face facing toward the medium facing surface 80 and located at a distance from the medium facing surface 80. The coupling layer 29 lies on the coupling layer 26.

The coil 30 includes a first layer 31 and a second layer 32. The first layer 31 and the second layer 32 are connected in series, for example. The first layer 31 is wound around the coupling layer 29. The recording head unit further includes an insulating film 33, an insulating layer 34, and an insulating layer 35. The insulating film 33 is interposed between the first layer 31 and each of the coupling layers 28 and 29 and the dielectric layer 27. The insulating layer 34 lies around the first layer 31 and the coupling layer 28 and in the space between adjacent turns of the first layer 31. The insulating layer 35 lies on the first layer 31, the insulating film 33, and the insulating layer 34. The insulating film 33 and the insulating layers 34 and 35 are formed of alumina, for example.

The coupling layer 36 lies on the coupling layer 28. The coupling layer 36 has an end face facing toward the medium facing surface 80 and located at a distance from the medium facing surface 80. The coupling layer 37 lies on the coupling layer 29.

The second layer 32 of the coil 30 lies above the first layer 31. The second layer 32 is wound around the coupling layer 37. The recording head unit further includes an insulating film 38, an insulating layer 39, and an insulating layer 40. The insulating film 38 is interposed between the second layer 32 and each of the coupling layers 36 and 37 and the insulating layer 35. The insulating layer 39 lies around the second layer 32 and the coupling layer 36 and in the space between adjacent turns of the second layer 32. The insulating layer 40 lies on the second layer 32, the insulating film 38, and the insulating layer 39. The insulating film 38 and the insulating layers 39 and 40 are formed of alumina, for example.

The yoke layer 41 lies on the coupling layers 36 and 37 and the insulating layer 40. The yoke layer 41 has an end face facing toward the medium facing surface 80 and located at a distance from the medium facing surface 80. The recording head unit further includes an insulating layer 42 provided around the yoke layer 41. The insulating layer 42 is formed of alumina, for example.

As shown in FIG. 3 and FIG. 4, the thermally-assisted magnetic recording head 100 further includes a protective layer 43 disposed to cover the recording head unit. The protective layer 43 is formed of alumina, for example.

As has been described, the thermally-assisted magnetic recording head 100 according to the present embodiment includes the medium facing surface 80, the read head unit, and the recording head unit. The read head unit and the recording head unit are stacked on the substrate 1. The recording head unit is located on the front side (the trailing side) in the direction of travel of the recording medium 90 (the Z direction), relative to the read head unit.

The recording head unit includes the coil 30, the main pole 25, the waveguide, the plasmon generator 50, the heat sink 53, the shield 15, and the return path section R. The plasmon generator 50 and the main pole 25 are located on the front side in the direction of travel of the recording medium 90 relative to the core 20 of the waveguide.

The shield 15 and the return path section R have the function of allowing a magnetic flux that has been produced from the front end face 25a of the main pole 25 and has magnetized a portion of the recording medium 90 to flow back to the main pole 25.

Figure 1:
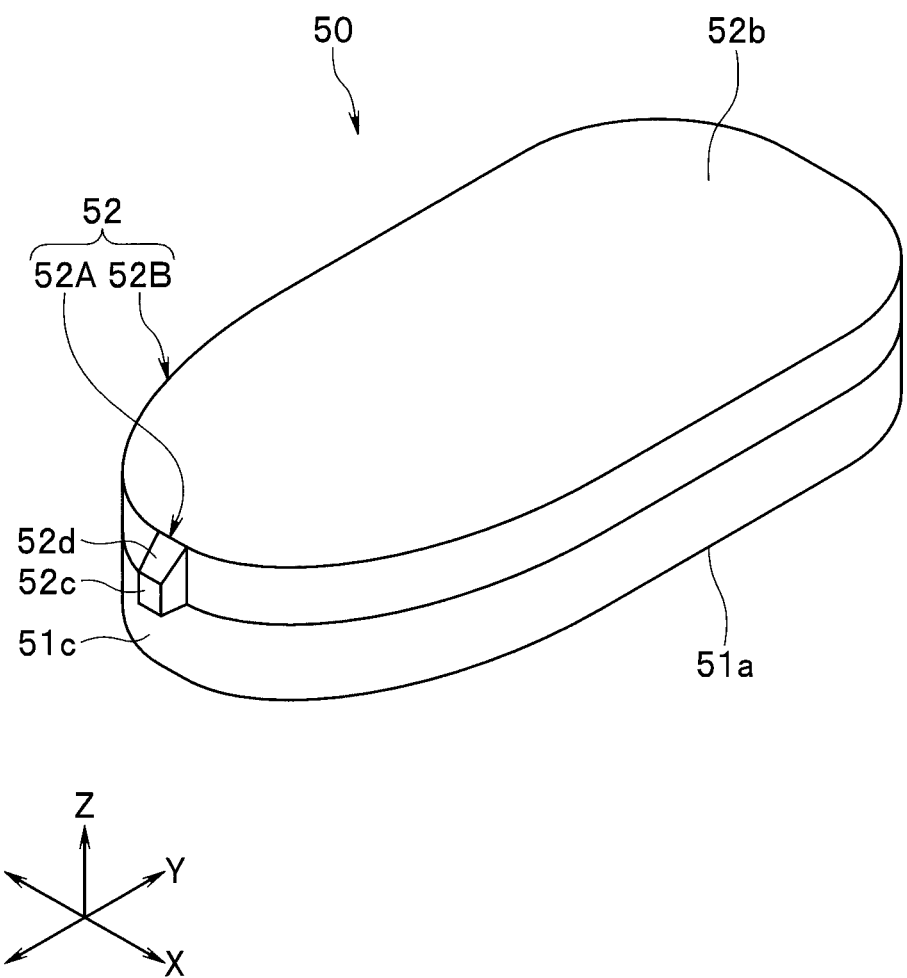
FIG. 1 is a perspective view showing a plasmon generator of a first embodiment of the invention.

The plasmon generator 50 will now be described in detail with reference to FIG. 1 and FIG. 2. FIG. 1 is a perspective view showing the plasmon generator 50. FIG. 2 is a cross-sectional view showing essential parts of the thermally-assisted magnetic recording head 100. FIGS. 1 and 2 also show the X, Y, and Z directions mentioned previously.

The first metal layer 51 of the plasmon generator 50 is a so-called planar plasmon generator (PPG). The first metal layer 51 has a thickness (dimension in the Z direction) in the range of 20 to 60 nm, for example.

The first metal layer 51 includes a plasmon exciting portion 51a configured to excite surface plasmons thereon. The plasmon exciting portion 51a is located at a predetermined distance from the evanescent light generating surface 20b of the core 20 and faces the evanescent light generating surface 20b. The cladding layer 21 is interposed between the evanescent light generating surface 20b and the plasmon exciting portion 51a.

The plasmon exciting portion 51a is the bottom surface of the first metal layer 51. The first metal layer 51 further includes a top surface 51b and a first end 51c located at a position closest to the medium facing surface 80 and away from the medium facing surface 80. The distance from the medium facing surface 80 to the first end 51c is in the range of 10 to 50 nm, for example.

The second metal layer 52 of the plasmon generator 50 includes a bottom surface 52a and a top surface 52b located on a side opposite to the bottom surface 52a. The bottom surface 52a of the second metal layer 52 is in contact with the top surface 51b of the metal layer 51. The top surface 52b of the second metal layer 52 is in contact with the heat sink 53.

The heat sink 53 includes a bottom surface 53a, a top surface 53b, and an end 53c located at a position closest to the medium facing surface 80 and away from the medium facing surface 80. The bottom surface 53a of the heat sink 53 is in contact with the top surface 52b of the second metal layer 52. The distance from the medium facing surface 80 to the end 53c is in the range of 80 to 100 nm, for example.

The second metal layer 52 further includes a front end face 52c that generates near-field light from surface plasmons, and a connecting surface that connects the top surface 52b and the front end face 52c. The front end face 52c is located in the medium facing surface 80. The front end face 52c generates near-field light on the principle to be described later.

The connecting surface of the second metal layer 52 includes an inclined portion 52d inclined relative to the direction perpendicular to the medium facing surface 80 (Y direction). In the present embodiment, the entire connecting surface is the inclined portion 52d. The inclined portion 52d includes a rear end farthest from the medium facing surface 80. The distance from the medium facing surface 80 to the rear end of the inclined portion 52d is preferably in the range of 20 to 80 nm, and more preferably in the range of 20 to 40 nm, for example. The angle that the inclined portion 52d forms with the direction perpendicular to the medium facing surface 80 is preferably in the range of 15° or more and less than 90°, and more preferably in the range of 30° to 60°, for example.

The second metal layer 52 includes a narrow portion 52A including the front end face 52c, and a wide portion 52B which is located farther from the medium facing surface 80 than is the narrow portion 52A. The width of the narrow portion 52A in the track width direction (the X direction) may be constant regardless of distance from the medium facing surface 80, or may decrease toward the medium facing surface 80. The wide portion 52B has a maximum width greater than a maximum width of the narrow portion 52A in the track width direction (X direction). The rear end of the inclined portion 52d of the connecting surface of the second metal layer 52 may be located in the narrow portion 52A, in the wide portion 52B, or at the border between the narrow portion 52A and the wide portion 52B. In the present embodiment, the rear end is located at the border.

The width (the dimension in the track width direction (the X direction) of the front end face 52c is defined by the width of the narrow portion 52A in the medium facing surface 80. The width of the front end face 52c falls within the range of 5 to 40 nm, for example. The height (the dimension in the Z direction) of the front end face 52c is defined by the thickness (the dimension in the Z direction) of the narrow portion 52A in the medium facing surface 80. The height of the front end face 52c is preferably in the range of 5 to 40 nm, and more preferably in the range of 16 to 20 nm, for example.

Because of the provision of the inclined portion 52d, the thickness of the narrow portion 52A in the medium facing surface 80 is smaller than the maximum thickness of the wide portion 52B. The maximum thickness of the wide portion 52B is preferably in the range of 40 to 60 nm, and more preferably 40 to 50 nm, for example. The wide portion 52B may have a constant thickness.

The first metal layer 51 is formed of a metal material suitable for excitation and propagation of surface plasmons. The metal material used to form the first metal layer 51 will hereinafter be referred to as a first metal material.

The second metal layer 52 includes the front end face 52c that generates near-field light. Part of the energy of the near-field light is converted into heat in the second metal layer 52. To avoid deformation or breakage due to the heat generation, the second metal layer 52 is therefore formed of a metal material having high hardness. The metal material used to form the second metal layer 52 will hereinafter be referred to as a second metal material.

The second metal material may have Vickers hardness higher than that of the first metal material. The second metal material may contain any one of Rh, Pt, and Ir. The second metal layer 52 may be formed of any one of Rh, Pt, and Ir, or an alloy such as a PtAu alloy, a PtRh alloy, a PtIr alloy, a RhAu alloy, and an IrAu alloy.

The first metal material may have electrical conductivity higher than that of the second metal material. The first metal material may include any one of Au, Cu, Ag, and Al. Au is particularly preferable.

Now, the principle of generation of near-field light in the present embodiment and the principle of thermally-assisted magnetic recording using near-field light will be described in detail. Laser light emitted from a laser diode (not shown) enters the core 20. As shown in FIG. 3, the laser light 70 propagates through the core 20 toward the medium facing surface 80 and reaches the vicinity of the first metal layer 51 of the plasmon generator 50. The evanescent light generating surface 20b of the core 20 generates evanescent light from the laser light 70 propagating through the core 20. More specifically, the laser light 70 is totally reflected at the evanescent light generating surface 20b, and this causes the evanescent light generating surface 20b to generate evanescent light permeating into the cladding layer 21. In the first metal layer 51, surface plasmons are excited on the plasmon exciting portion 51a through coupling with the aforementioned evanescent light. The excited surface plasmons propagate to the front end face 52c through the first metal layer 51 and the second metal layer 52. The second metal layer 52 generates near-field light from those surface plasmons at the front end face 52c.

The near-field light generated at the front end face 52c is projected toward the recording medium 90, reaches the surface of the recording medium 90, and heats a part of the magnetic recording layer of the recording medium 90. This lowers the coercivity of the part of the magnetic recording layer. In thermally-assisted magnetic recording, the part of the magnetic recording layer with the lowered coercivity is subjected to a write magnetic field produced by the main pole 25 for data writing.

Now, functions and effects specific to the thermally-assisted magnetic recording head 100 according to the present embodiment will be described. In the present embodiment, the second metal layer 52 of the plasmon generator 50 includes the bottom surface 52a, the top surface 52b, the front end face 52c that generates near-field light from surface plasmons, and the connecting surface that connects the top surface 52b and the front end face 52c. The connecting surface includes the inclined portion 52d. According to the present embodiment, the volume and heat capacity of the second metal layer 52 can thus be increased by increasing the thickness of the second metal layer 52 at a position away from the medium facing surface 80 while reducing the thickness of the second metal layer 52 in the medium facing surface 80. Consequently, according to the present embodiment, a temperature increase of the second metal layer 52 can be suppressed to prevent deformation of the first metal layer 51 in contact with the bottom surface 52a of the second metal layer 52.

In the present embodiment, the heat sink 53 is in contact with the top surface 52b of the second metal layer 52 at a position away from the medium facing surface 80. This can also suppress a temperature increase of the second metal layer 52 to prevent the deformation of the first metal layer 51.

A method of manufacturing the thermally-assisted magnetic recording head 100 according to the present embodiment will now be described. The method of manufacturing the thermally-assisted magnetic recording head 100 includes the steps of: forming components of a plurality of thermally-assisted magnetic recording heads 100, except the substrates 1, on a wafer that includes portions to become the substrates 1 of the plurality of thermally-assisted magnetic recording heads 100, thereby fabricating a substructure including a plurality of pre-head portions arranged in rows, the plurality of pre-head portions becoming individual thermally-assisted magnetic recording heads 100 later; and cutting the substructure to separate the plurality of pre-head portions from each other and forming the medium facing surface 80 for each of the plurality of pre-head portions (this step will be referred to as the step of forming the medium facing surface 80). A plurality of thermally-assisted magnetic recording heads 100 are produced in this manner.

The method of manufacturing the thermally-assisted magnetic recording head 100 according to the present embodiment will be described in more detail below with attention focused on a single thermally-assisted magnetic recording head 100. The method of manufacturing the thermally-assisted magnetic recording head 100 starts with forming the insulating layer 2, the bottom shield layer 3, and the bottom shield gap film 4 in this order on the substrate 1. Then, the MR element 5 and two leads (not shown) connected to the MR element 5 are formed on the bottom shield gap film 4. The top shield gap film 6 is then formed to cover the MR element 5 and the leads. Next, the top shield layer 7, the insulating layer 8, the middle shield layer 9, and the nonmagnetic layer 10 are formed in this order on the top shield gap film 6.

The return pole layer 11 is then formed on the nonmagnetic layer 10. Next, an unshown insulating layer is formed to cover the return pole layer 11. The unshown insulating layer is then polished by, for example, chemical mechanical polishing (hereinafter referred to as CMP), until the return pole layer 11 is exposed. Next, the coupling layers 12 and 13 are formed on the return pole layer 11. Then, the insulating layer 14 is formed over the entire top surface of the stack. The insulating layer 14 is then polished by, for example, CMP, until the coupling layers 12 and 13 are exposed.

The shield 15 is then formed on the coupling layer 12. Next, the cladding layer 19 is formed over the entire top surface of the stack. The cladding layer 19 is then selectively etched to form therein two openings for exposing the top surface of the coupling layer 13. Next, the first layers of the coupling sections 16A and 16B are formed on the coupling layer 13 at the locations of the two openings. The core 20 is then formed on the cladding layer 19. Next, the surrounding cladding layer is formed over the entire top surface of the stack. The surrounding cladding layer and the cladding layer 19 are then polished by, for example, CMP until the core 20 and the first layers of the coupling sections 16A and 16B are exposed.

Reference is now made to FIG. 5A to FIG. 13 to describe steps to be performed after the polishing of the cladding layer 19 up to the formation of the main pole 25. FIG. 5A to FIG. 13 each show a stack of layers formed in the process of manufacturing the thermally-assisted magnetic recording head 100. Fig. nA (n is an integer between 5 and 12 inclusive) shows the top surface of part of the stack. Fig. nB and FIG. 13 each show a cross section that intersects the front end face 25a of the main pole 25 and that is perpendicular to the medium facing surface 80 and to the top surface la of the substrate 1. In FIG. 5A to FIG. 13, the symbol "ABS" indicates the location at which the medium facing surface 80 is to be formed. Fig. nB and FIG. 13 omit the illustration of portions located below the shield 15 and the cladding layer 19.

Figure 5A:
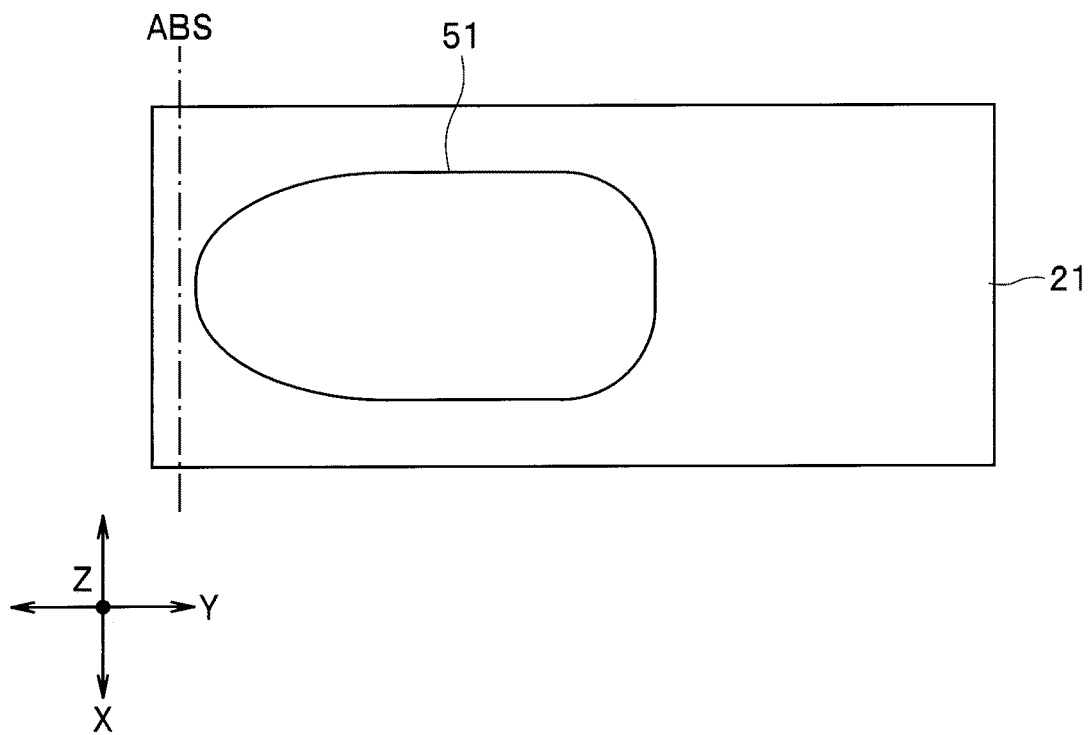
FIGS. 5A and 5B are explanatory diagrams showing a step of a manufacturing method for the thermally-assisted magnetic recording head according to the first embodiment of the invention.
Figure 5B:
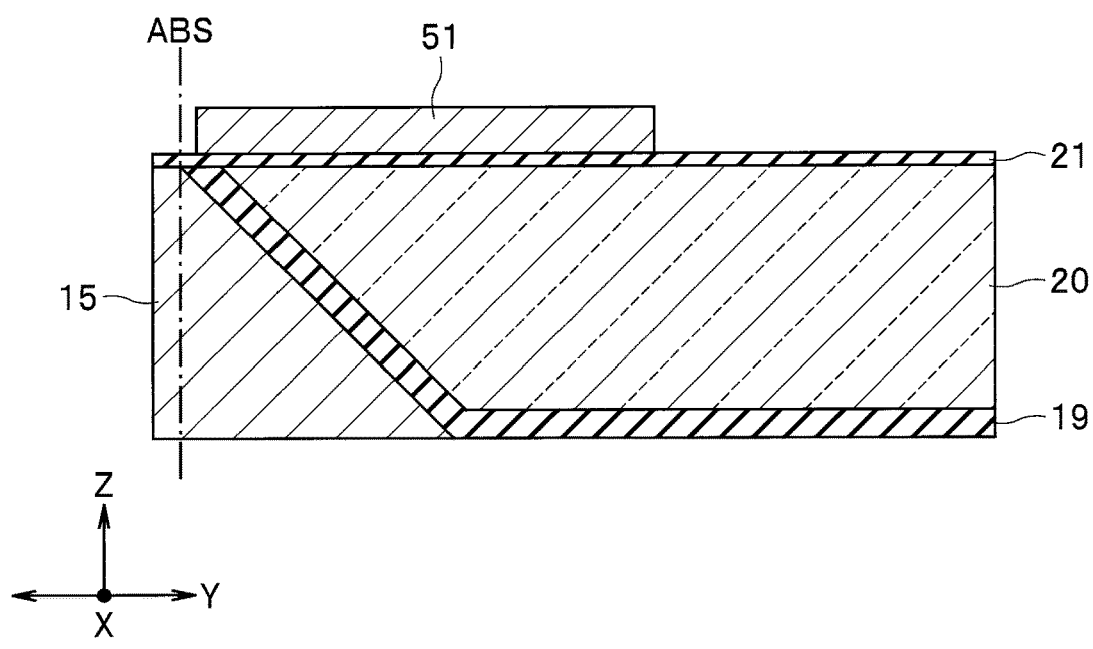

FIG. 5A and FIG. 5B show a step that follows the polishing of the cladding layer 19. In this step, the cladding layer 21 is initially formed on the entire top surface of the stack. Next, a metal film made of the first metal material is formed on the cladding layer 21 by sputtering, for example. Next, the metal film is etched by ion beam etching (hereinafter, referred to as IBE), for example, so that the metal film makes the first metal layer 51.

Figure 6A:
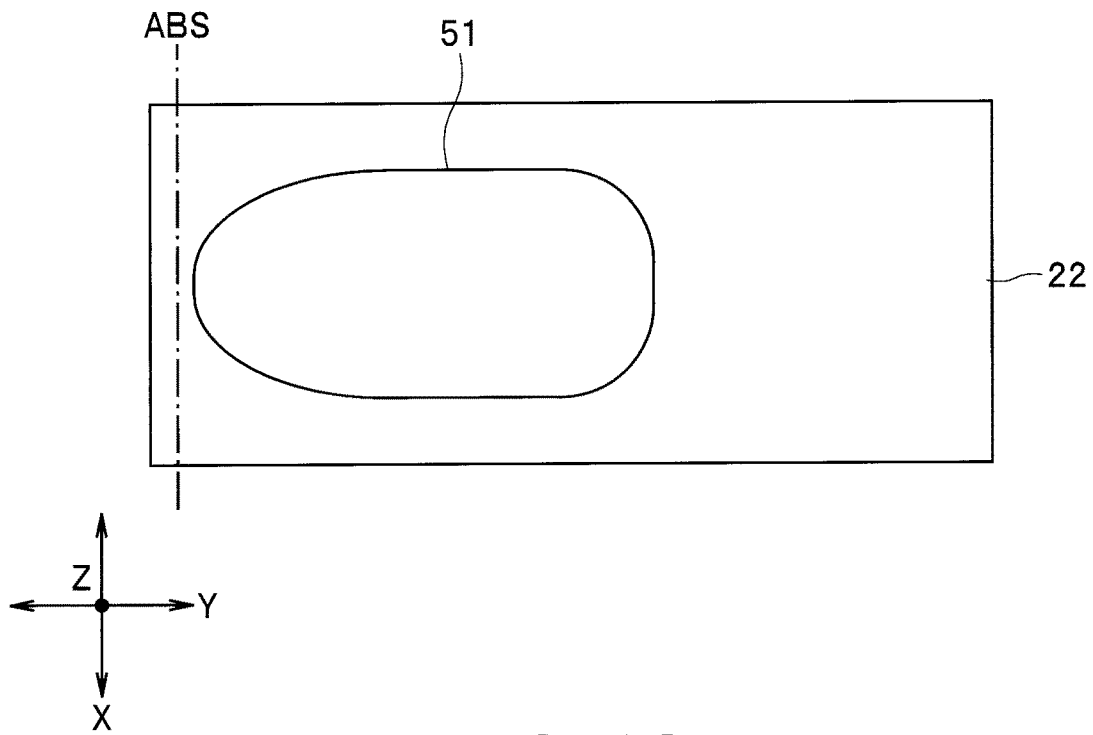
FIGS. 6A and 6B are explanatory diagrams showing a step that follows the step shown in FIGS. 5A and 5B.
Figure 6B:
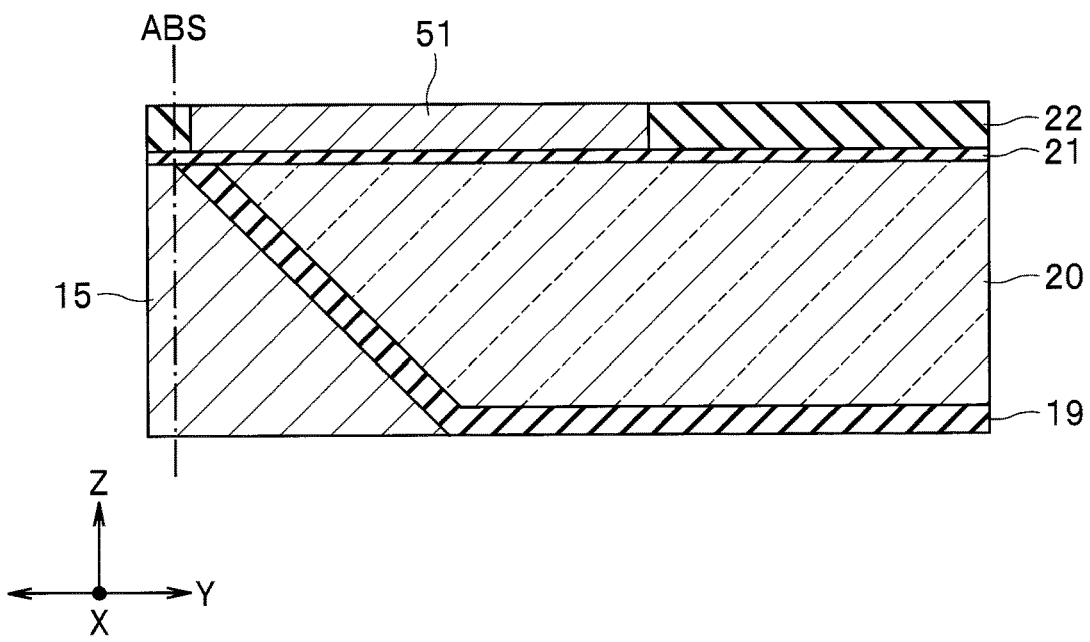

FIG. 6A and FIG. 6B show the next step. In this step, the cladding layer 22 is initially formed on the entire top surface of the stack. Next, the cladding layer 22 is polished by CMP, for example, until the first metal layer 51 is exposed.

Figure 7A:
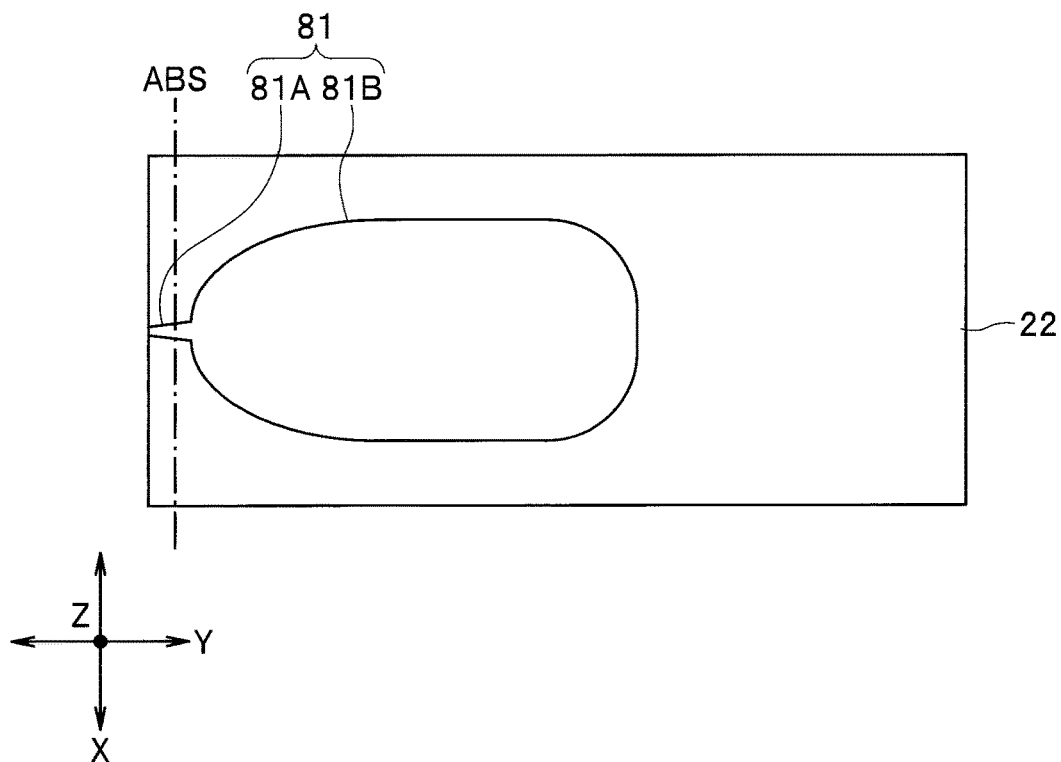
FIGS. 7A and 7B are c explanatory diagrams showing a step that follows the step shown in FIGS. 6A and 6B.
Figure 7B:
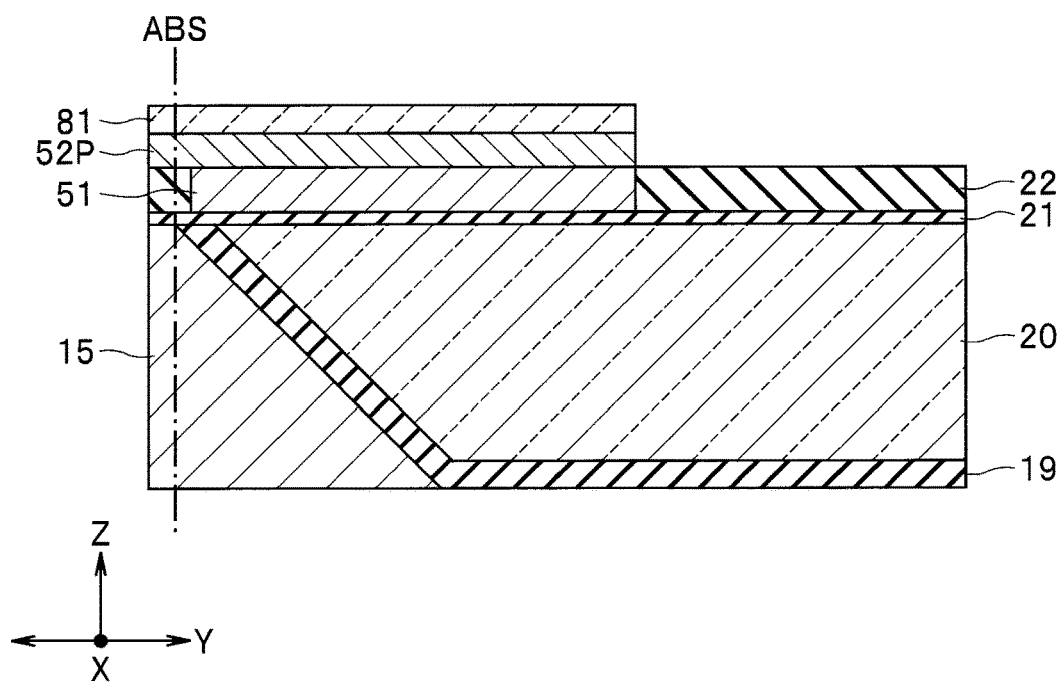

FIG. 7A and FIG. 7B show the next step. In this step, a metal film 52P made of the first metal material is initially formed on the first metal layer 51 and the cladding layer 22 by sputtering, for example. Next, a mask 81 for patterning the metal film 52P is formed on the metal film 52P. The mask 81 is formed of carbon, for example. The mask 81 includes a first portion 81A and a second portion 81B. The first portion 81A has a planar shape corresponding to that of the narrow portion 52A of the second metal layer 52 to be eventually formed. The second portion 81B has a planar shape corresponding to that of the wide portion 52B of the second metal layer 52 to be eventually formed. Next, using the mask 81, the metal film 52P is etched by IBE, for example. Next, the mask 81 is removed.

Figure 8A:
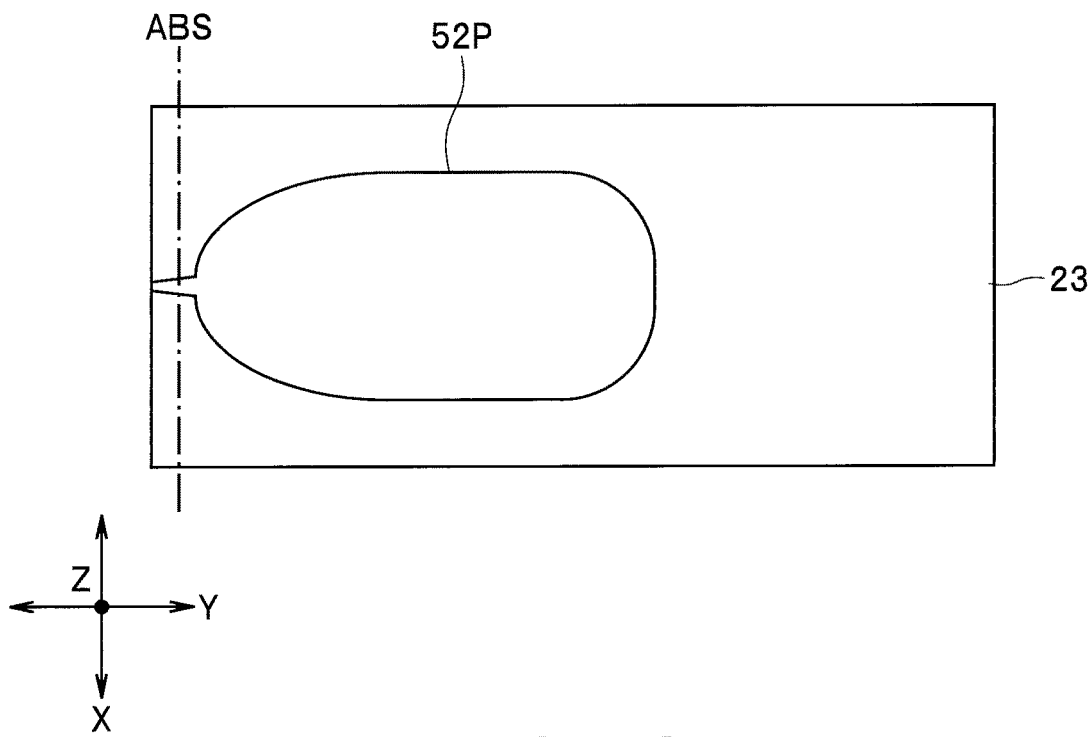
FIGS. 8A and 8B are explanatory diagrams showing a step that follows the step shown in FIGS. 7A and 7B.
Figure 8B:
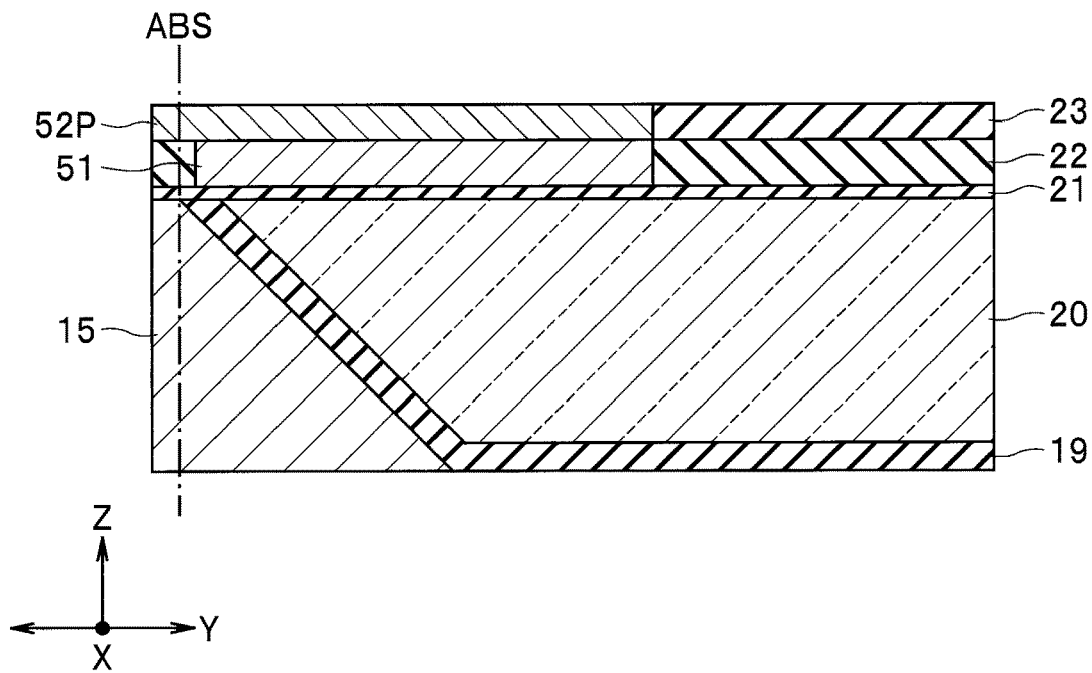

FIG. 8A and FIG. 8B show the next step. In this step, the dielectric layer 23 is initially formed on the entire top surface of the stack. Next, the dielectric layer 23 is polished by CMP, for example, until the metal film 52P is exposed.

Figure 9A:
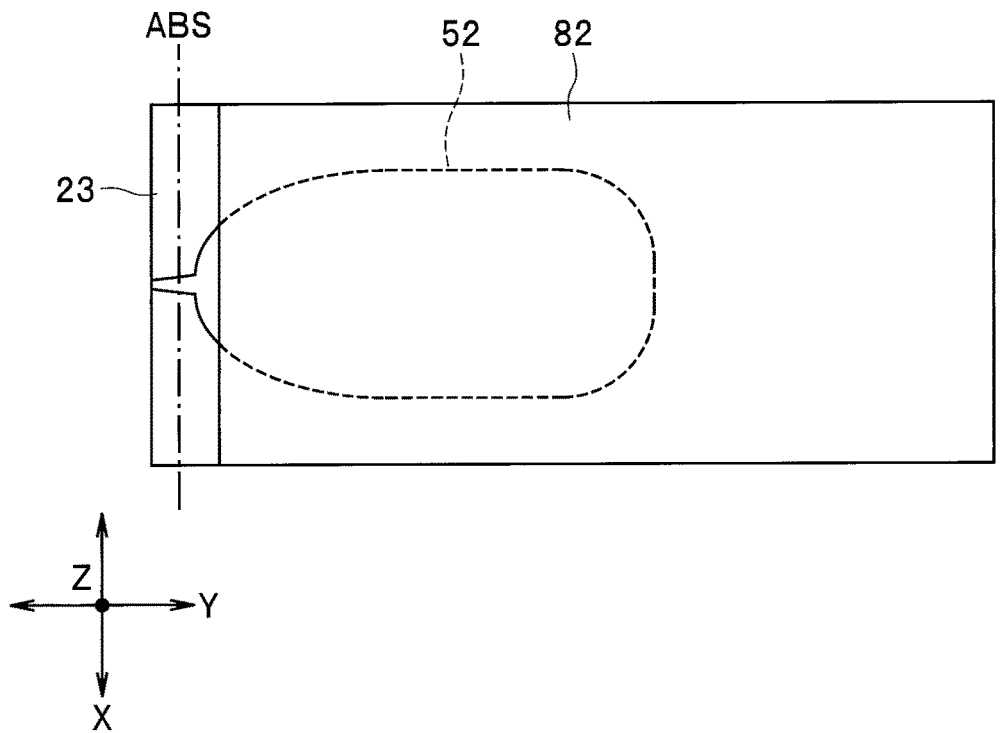
FIGS. 9A and 9B are explanatory diagrams showing a step that follows the step shown in FIGS. 8A and 8B.
Figure 9B:
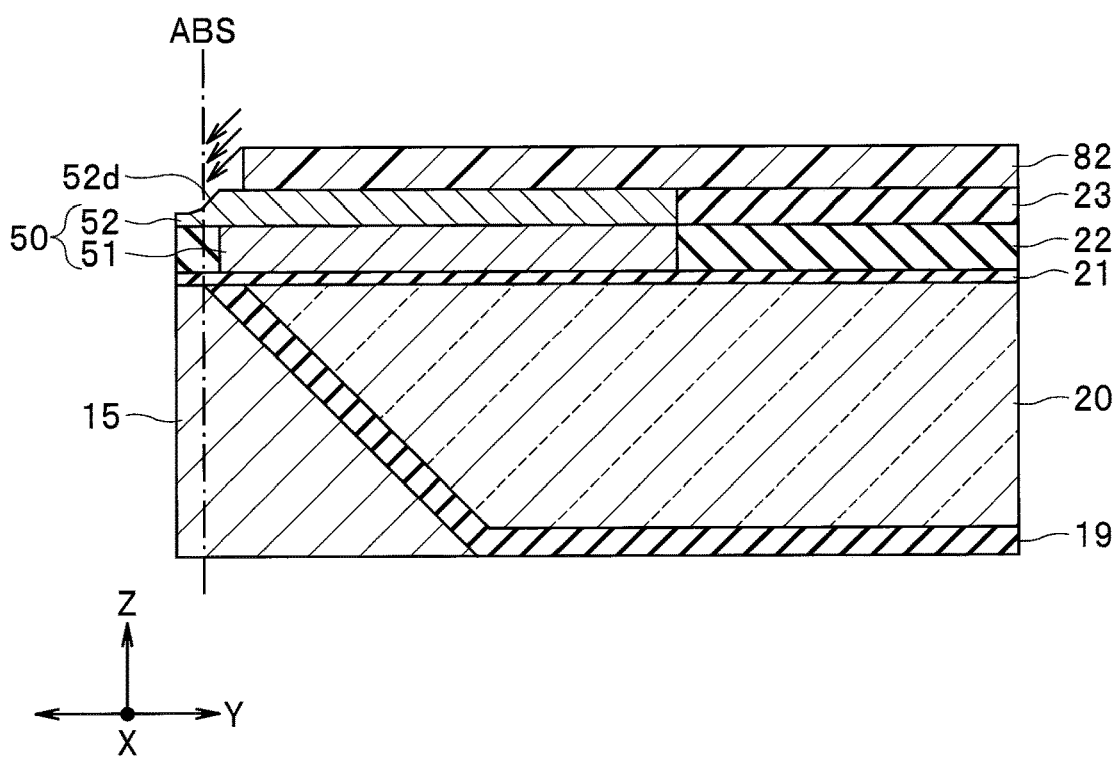

FIG. 9A and FIG. 9B show the next step. In this step, a photoresist mask 82 is initially formed on the metal film 52P and the dielectric layer 23. The photoresist mask 82 is formed by patterning a photoresist layer by photolithography. The photoresist mask 82 does not cover a location ABS where the medium facing surface 80 is to be formed or its vicinity on the top surface of the metal film 52P.

Figure 10A:
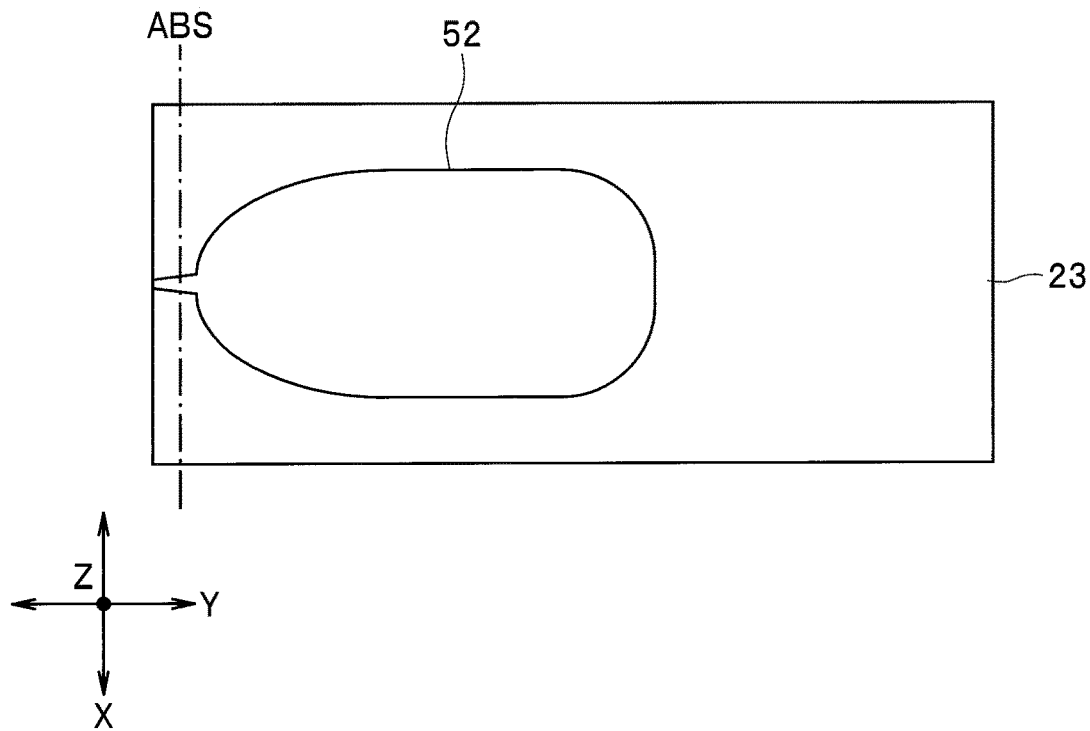
FIGS. 10A and 10B are explanatory diagrams showing a step that follows the step shown in FIGS. 9A and 9B.
Figure 10B:
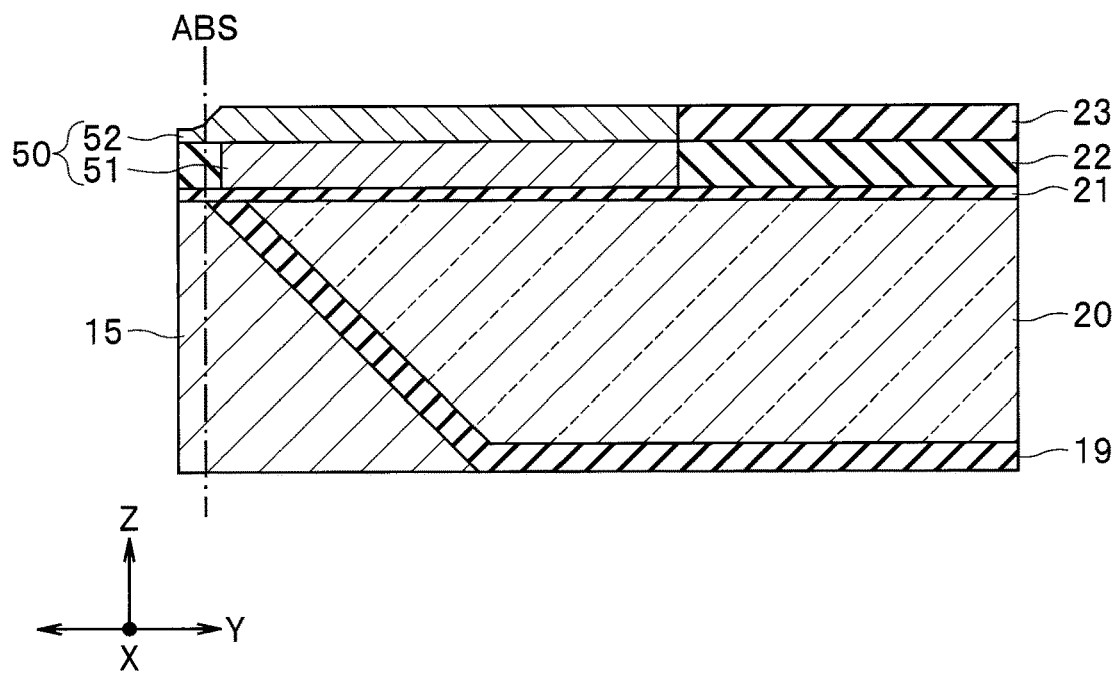

Next, a first etching step of taper etching the metal film 52P and the dielectric layer 23 is performed so that the inclined portion 52d of the connecting surface of the second metal layer 52 is formed in the metal film 52P. The first etching step is performed by using IBE, for example. In using IBE, the traveling direction of the ion beam is inclined relative to the top surface of the metal film 52P. The arrows in FIG. 9B indicate the traveling direction of the ion beam. The formation of the inclined portion 52d in the metal film 52P completes the second metal layer 52. This also completes the plasmon generator 50. Next, the photoresist mask 82 is removed as shown in FIGS. 10A and 10B.

Figure 11A:
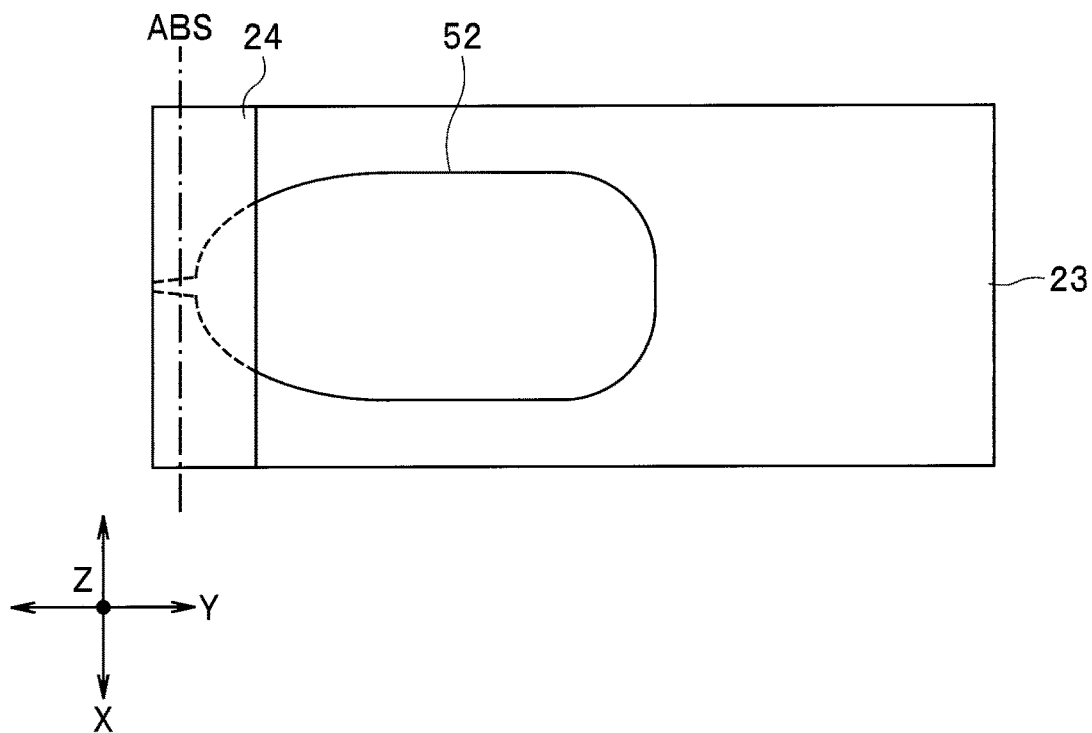
FIGS. 11A and 11B are explanatory diagrams showing a step that follows the step shown in FIGS. 10A and 10B.
Figure 11B:
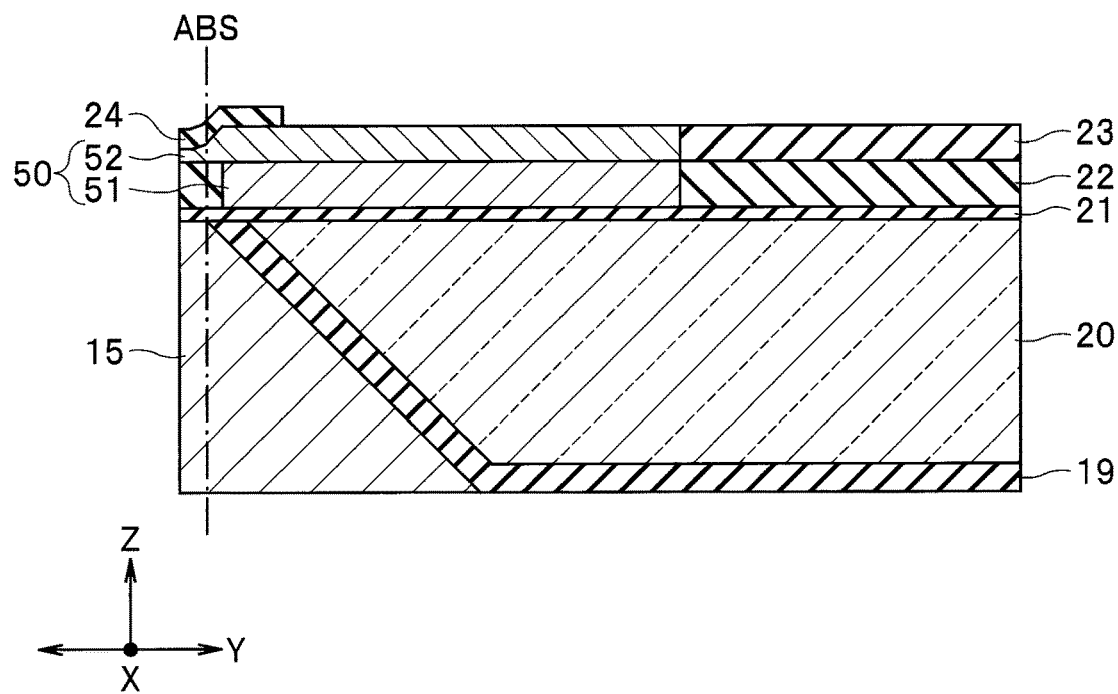

FIG. 11A and FIG. 11B show the next step. In this step, the dielectric layer 24 is initially formed on the entire top surface of the stack. Next, a portion of the dielectric layer 24 other than the location ABS where the medium facing surface 80 is to be formed or its vicinity is removed.

Figure 12A:
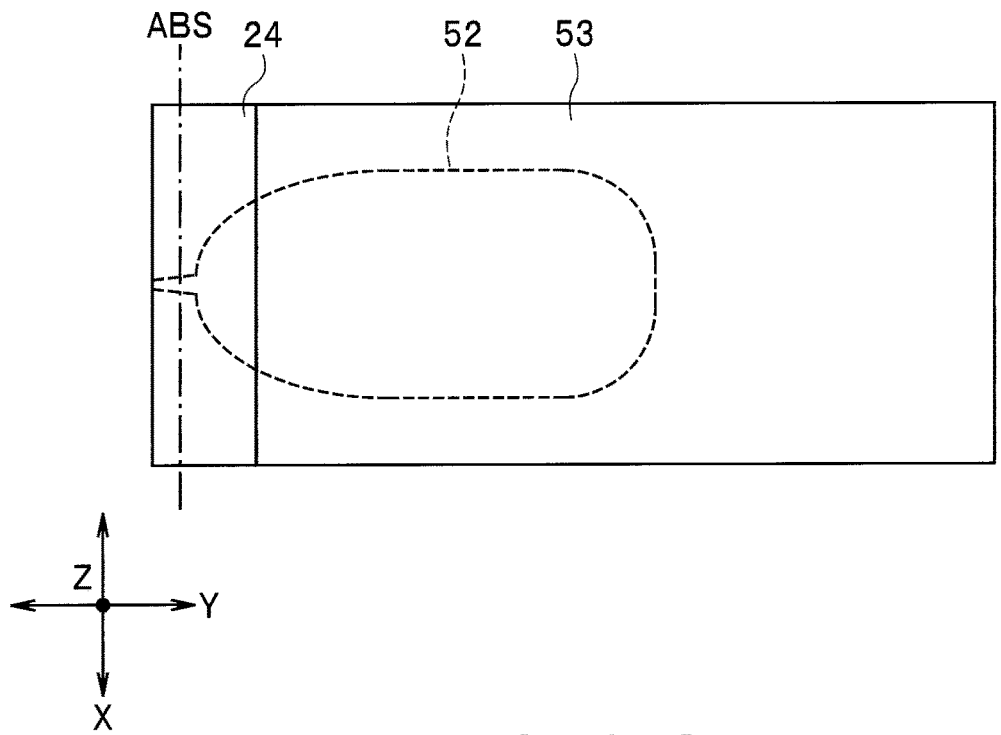
FIGS. 12A and 12B are explanatory diagrams showing a step that follows the step shown in FIGS. 11A and 11B.
Figure 12B:
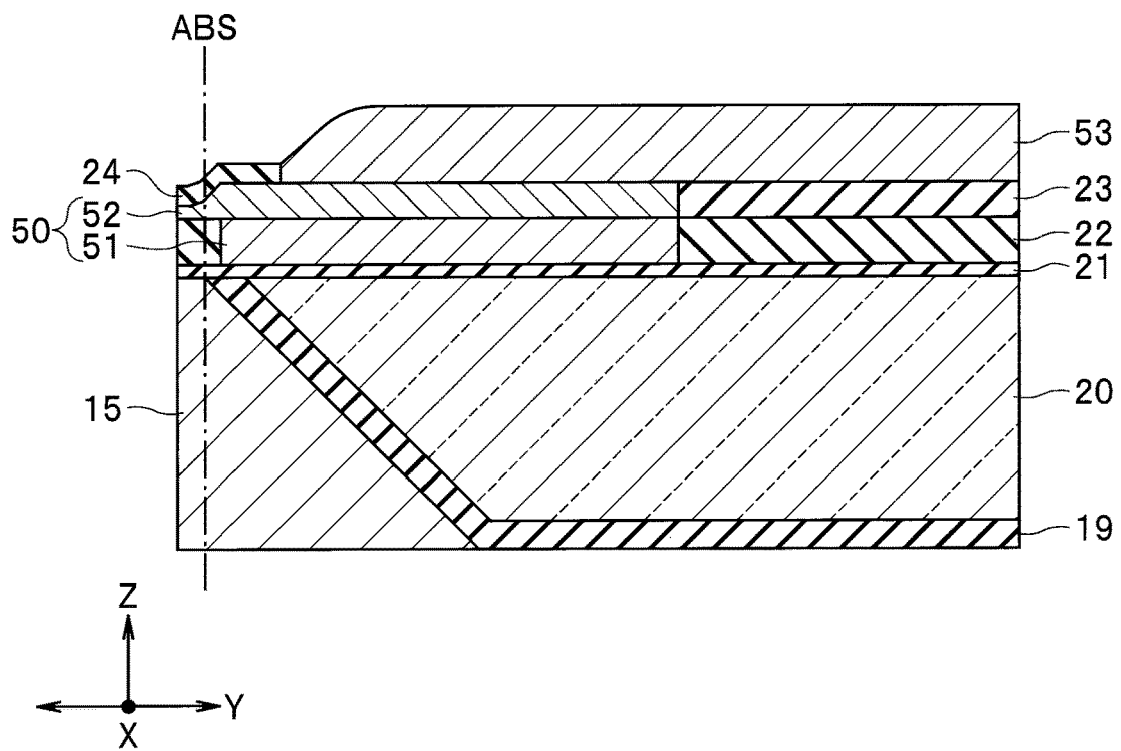

FIG. 12A and FIG. 12B show the next step. In this step, the heat sink 53 is formed on the second metal layer 52 and the dielectric layer 23 by a lift-off method, for example.

Figure 13:
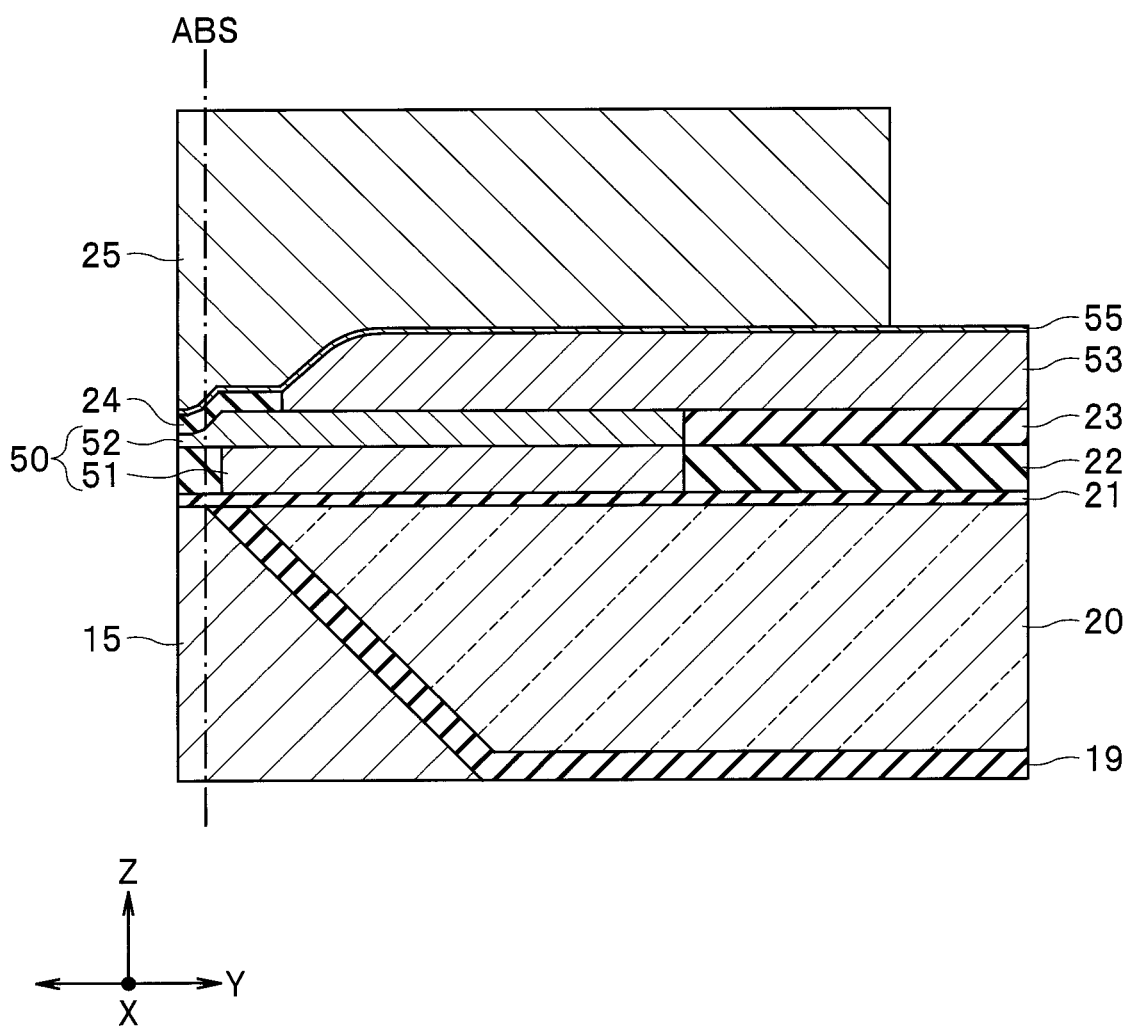
FIG. 13 is cross-sectional views showing a step that follows the step shown in FIGS. 12A and 12B.

FIG. 13 shows the next step. In this step, the separating film 55 is initially formed on the dielectric layer 24 and the heat sink 53. Next, an unshown photoresist layer is formed. The photoresist layer has a first opening having a shape corresponding to that of the main pole 25, and a second opening having a shape corresponding to that of the coupling layer 26. Next, the main pole 25 is formed in the first opening and the coupling layer 26 is formed in the second opening by plating, for example. Next, the photoresist layer is removed.

FIG. 3. The dielectric layer 27 is initially formed on the entire top surface of the stack. Next, the dielectric layer 27 is polished by CMP, for example, until the main pole 25 and the coupling layer 26 are exposed. Next, the coupling layer 28 is formed on the main pole 25, and the coupling layer 29 on the coupling layer 26.

Next, the insulating film 33 is formed over the entire top surface of the stack. Then, the first layer 31 of the coil 30 is formed on the insulating film 33. The insulating layer 34 is then formed over the entire top surface of the stack. The insulating film 33 and the insulating layer 34 are then polished by, for example, CMP, until the coupling layers 28 and 29 and the first layer 31 are exposed. Next, the insulating layer 35 is formed over the entire top surface of the stack. The insulating layer 35 is then selectively etched to form therein an opening for exposing the top surface of the coupling layer 28 and an opening for exposing the top surface of the coupling layer 29.

Next, the coupling layer 36 is formed on the coupling layer 28, and the coupling layer 37 is formed on the coupling layer 29. Then, the insulating film 38 is formed over the entire top surface of the stack. The insulating layer 35 and the insulating film 38 are then selectively etched to form therein an opening for connecting the second layer 32 of the coil 30 to the first layer 31 of the coil 30. Next, the second layer 32 of the coil 30 is formed on the insulating film 38. Next, the insulating layer 39 is formed over the entire top surface of the stack. The insulating film 38 and the insulating layer 39 are then polished by, for example, CMP, until the coupling layers 36 and 37 and the second layer 32 are exposed.

Next, the insulating layer 40 is formed on the second layer 32 of the coil 30 and the insulating layer 39. The yoke layer 41 is then formed on the coupling layers 36 and 37 and the insulating layer 40. Next, the insulating layer 42 is formed over the entire top surface of the stack. The insulating layer 42 is then polished by, for example, CMP, until the yoke layer 41 is exposed. Then, the protective layer 43 is formed to cover the yoke layer 41 and the insulating layer 42. Wiring, terminals, and other components are then formed on the top surface of the protective layer 43. When the substructure is thus completed, the step of forming the medium facing surface 80 is performed. A protective film for covering the medium facing surface 80 may be formed thereafter. Being provided with the medium facing surface 80, each pre-head portion becomes a thermally-assisted magnetic recording head 100.

The step of forming the medium facing surface 80 includes the step of polishing the surface of each pre-head portion that has resulted from cutting the substructure, and the step of forming a rail on the polished surface for allowing the slider to fly.

As described above, the manufacturing method for the thermally-assisted magnetic recording head 100 according to the present embodiment includes the step of forming the main pole 25, the step of forming the waveguide, the step of forming the plasmon generator 50, and the step of forming the heat sink 53. The step of forming the waveguide includes the step of forming the core 20 and the steps of forming the respective cladding layers 19, 21, and 22, and surrounding cladding layers. The step of forming the plasmon generator 50 includes the step of forming the first metal layer 51 and the step of forming the second metal layer 52. The step of forming the second metal layer 52 includes the step of forming the metal film 52P of the second metal material, and the first etching step of taper etching the metal film 52P so that the inclined portion 52d of the connecting surface of the second metal layer 52 is formed in the metal film 52P.

Modification Example

Figure 14:
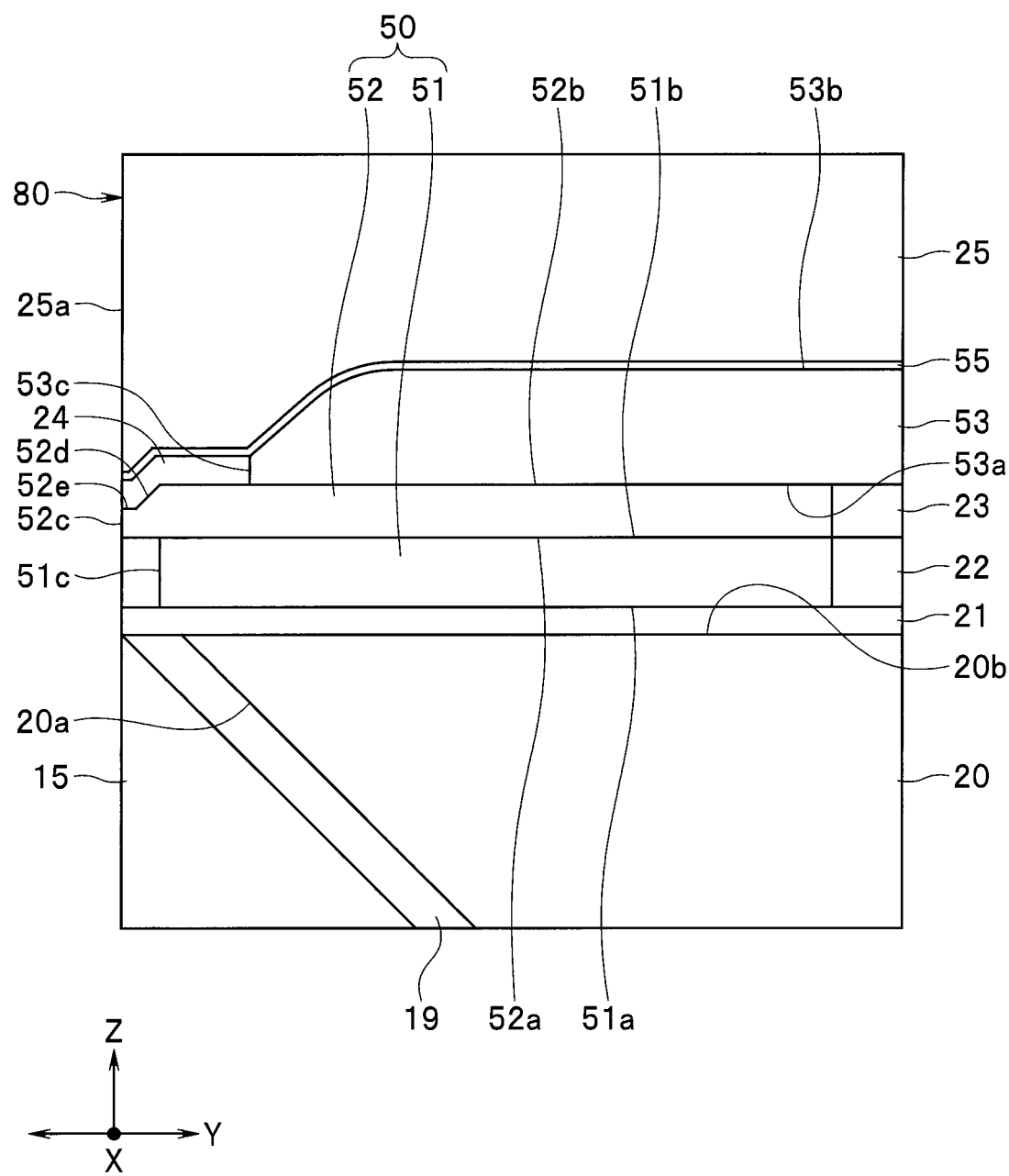
FIG. 14 is a cross-sectional view showing essential parts of a modification example of the magnetic head according to the first embodiment of the invention.

A modification example of the thermally-assisted magnetic recording head 100 according to the present embodiment will now be described. FIG. 14 is a cross-sectional view showing essential parts of the modification example of the thermally-assisted magnetic recording head 100. In the modification example, the connecting surface of the second metal layer 52 of the plasmon generator 50 includes an extended portion 52e in addition to the inclined portion 52d. The extended portion 52e is located between the medium facing surface 80 and the inclined portion 52d. The extended portion 52e may be extended substantially in the direction perpendicular to the medium facing surface 80 (Y direction), or may be inclined relative to the direction perpendicular to the medium facing surface 80. If the extended portion 52e is inclined, the angle that the extended portion 52e forms with the direction perpendicular to the medium facing surface 80 may be smaller than the angle that the inclined portion 52d forms with the direction perpendicular to the medium facing surface 80.

Second Embodiment

Figure 15:
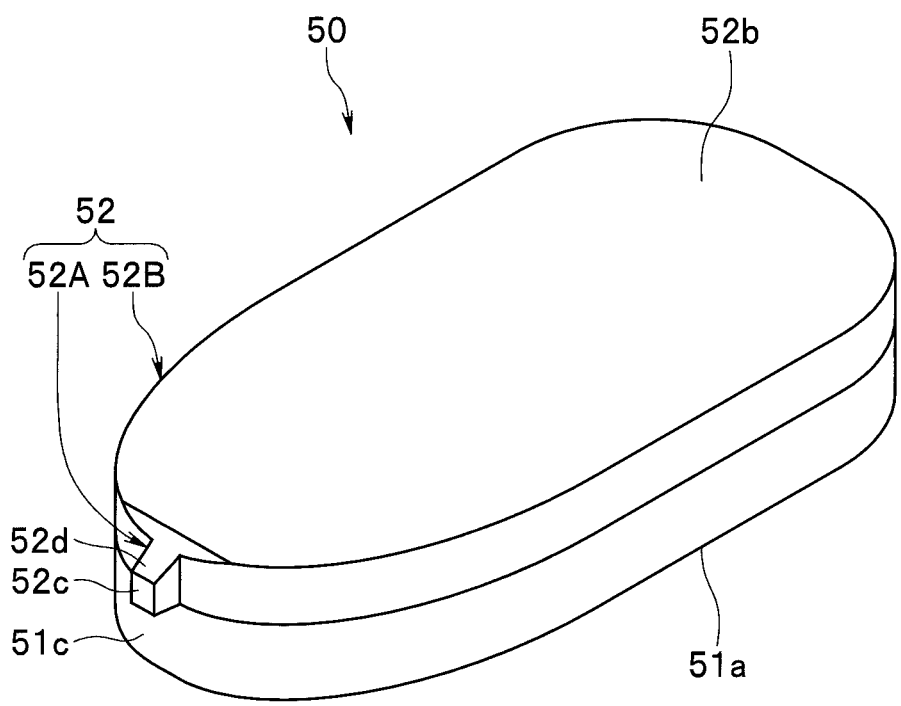
FIG. 15 is a perspective view showing a plasmon generator of a second embodiment of the invention.
Figure 15:
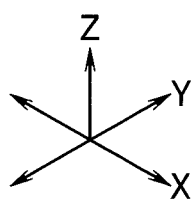
Figure 16:
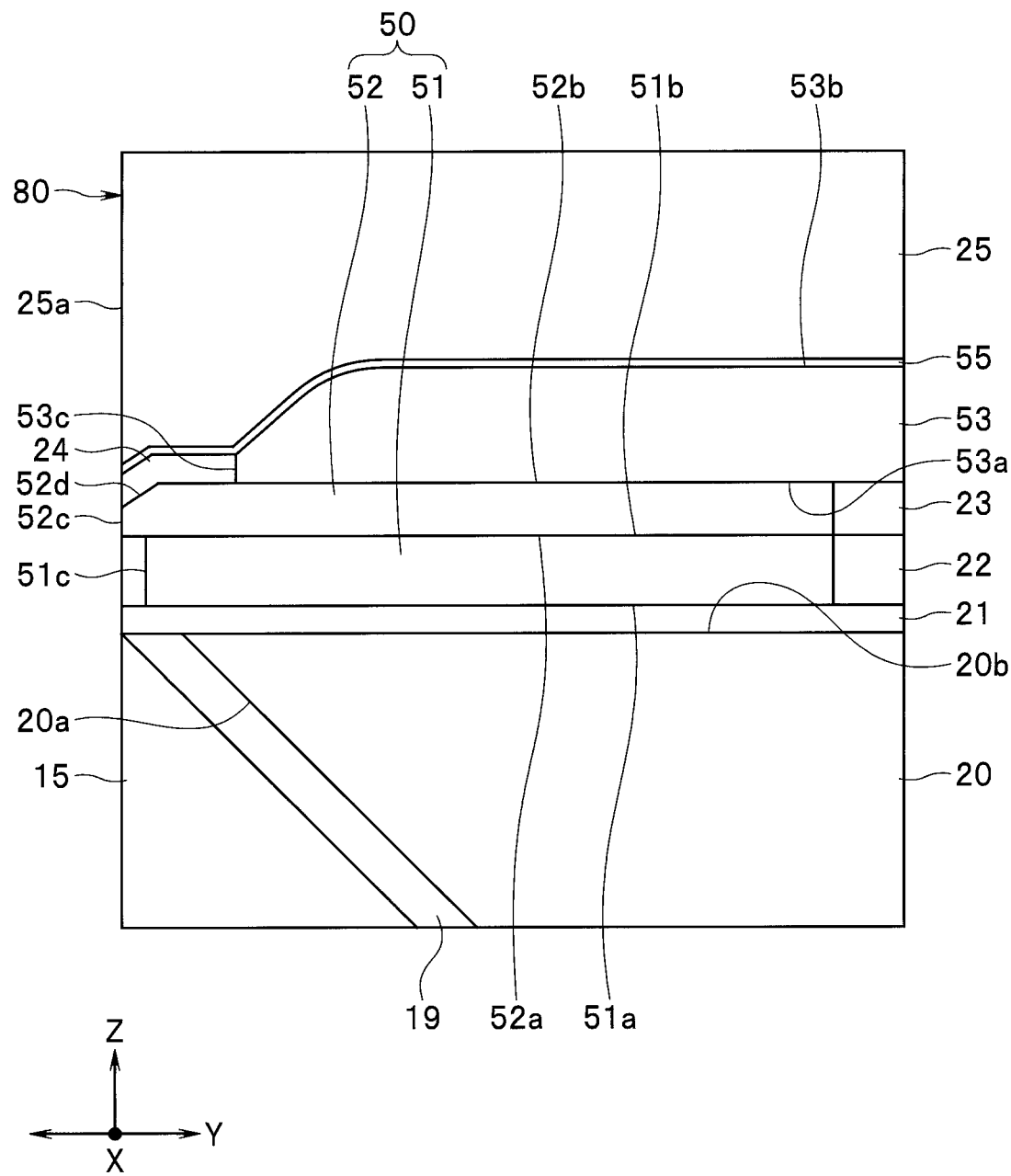
FIG. 16 is a cross-sectional view showing essential parts of a thermally-assisted magnetic recording head according to the second embodiment of the invention.

A second embodiment of the invention will now be described with reference to FIG. 15 and FIG. 16. FIG. 15 is a perspective view showing a plasmon generator of the present embodiment. FIG. 16 is a cross-sectional view showing essential parts of the thermally-assisted magnetic recording head according to the present embodiment.

The thermally-assisted magnetic recording head 100 according to the present embodiment is configured differently than in the first embodiment in the following ways. In the present embodiment, the second metal layer 52 of the plasmon generator 50 has a different shape than in the first embodiment. In the first embodiment, the rear end of the inclined portion 52d of the connecting surface of the second metal layer 52 is located at the border between the narrow portion 52A and the wide portion 52B of the second metal layer 52 (see FIG. 1). By contrast, in the present embodiment, the rear end is located in the wide portion 52B. The inclined portion 52d is formed to extend from the wide portion 52B to the narrow portion 52A.

The remainder of configuration, function and effects of the present embodiment are similar to those of the first embodiment.

Third Embodiment

Figure 17:
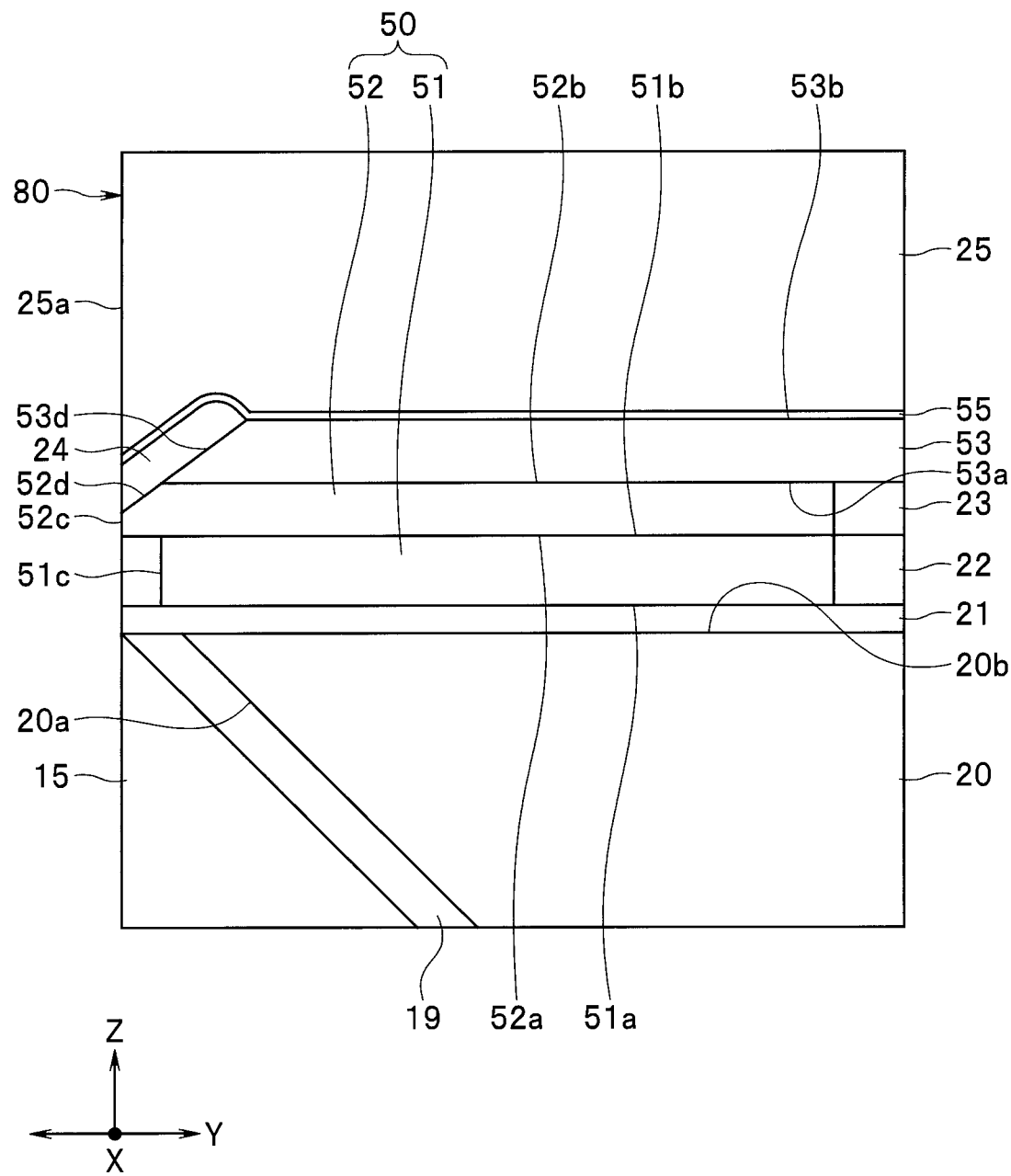
FIG. 17 is a cross-sectional view showing essential parts of a thermally-assisted magnetic recording head according to a third embodiment of the invention.

A third embodiment of the invention will now be described with reference to FIG. 17. FIG. 17 is a cross-sectional view showing essential parts of a thermally-assisted magnetic recording head according to the present embodiment.

The thermally-assisted magnetic recording head 100 according to the present embodiment is configured differently than in the first embodiment in the following ways. In the present embodiment, the heat sink 53 includes an inclined surface 53d instead of the end 53c of the first embodiment. The inclined surface 53d of the heat sink 53 is inclined relative to the direction perpendicular to the medium facing surface 80 (Y direction) and is continuous with the inclined portion 52d of the connecting surface of the second metal layer 52 of the plasmon generator 50. The dielectric layer 24 is located on the connecting surface of the second metal layer 52 and the inclined surface 53d of the heat sink 53.

The angle that the inclined surface 53d of the heat sink 53 forms with the direction perpendicular to the medium facing surface 80 may be the same as or different from the angle that the inclined portion 52d of the connecting surface of the second metal layer 52 forms with the direction perpendicular to the medium facing surface 80. A preferable range of the angle that the inclined surface 53d of the heat sink 53 forms with the direction perpendicular to the medium facing surface 80 is the same as the preferable range of the angle that the inclined portion 52d of the connecting surface of the second metal layer 52 forms with the direction perpendicular to the medium facing surface 80, described in the first embodiment.

The inclined surface 53d of the heat sink 53 includes a second end closest to the medium facing surface 80 and a third end farthest from the medium facing surface 80. The distance from the medium facing surface 80 to the second end of the inclined surface 53d is the same or substantially the same as that from the medium facing surface 80 to the rear end of the inclined portion 52d of the connecting surface of the second metal layer 52. The distance from the medium facing surface 80 to the second end of the inclined surface 53d may be less than or equal to a distance from the medium facing surface 80 to the first end 51c of the first metal layer 51. The distance from the medium facing surface 80 to the third end is in the range of 80 to 100 nm, for example.

The second end of the inclined surface 53d of the heat sink 53 is the end of the heat sink 53 closest to the medium facing surface 80. According to the embodiment, the end (second end) of the heat sink 53 closest to the medium facing surface 80 can be located even closer to the medium facing surface 80 than without the inclined surface 53d, provided that the end of the top surface 53b of the heat sink 53 closest to the medium facing surface 80 is located at the same position. According to the present embodiment, a temperature increase and deformation of the first metal layer 51 in contact with the bottom surface 52a of the second metal layer 52 can thus be suppressed by absorbing the heat of the second metal layer 52 at a position closer to the medium facing surface 80.

The foregoing effect of the heat sink 53 is more effectively exerted if the distance from the medium facing surface 80 to the second end of the inclined surface 53d is less than or equal to the distance from the medium facing surface 80 to the first end 51c of the first metal layer 51.

A manufacturing method for the thermally-assisted magnetic recording head 100 according to the present embodiment will now be described with reference to FIG. 18A to FIG. 21. FIG. 18A to FIG. 21 each show a stack of layers formed in the process of manufacturing the thermally-assisted magnetic recording head 100. Fig. nA (n is an integer between 18 and 20 inclusive) shows the top surface of part of the stack. Fig. nB and FIG. 21 each show a cross section that intersects the front end face 25a of the main pole 25 and that is perpendicular to the medium facing surface 80 and to the top surface 1a of the substrate 1. In FIG. 18A to FIG. 21, the symbol "ABS" indicates the location at which the medium facing surface 80 is to be formed. Fig. nB and FIG. 21 omit the illustration of portions located below the shield 15 and the cladding layer 19.

Figure 18A:
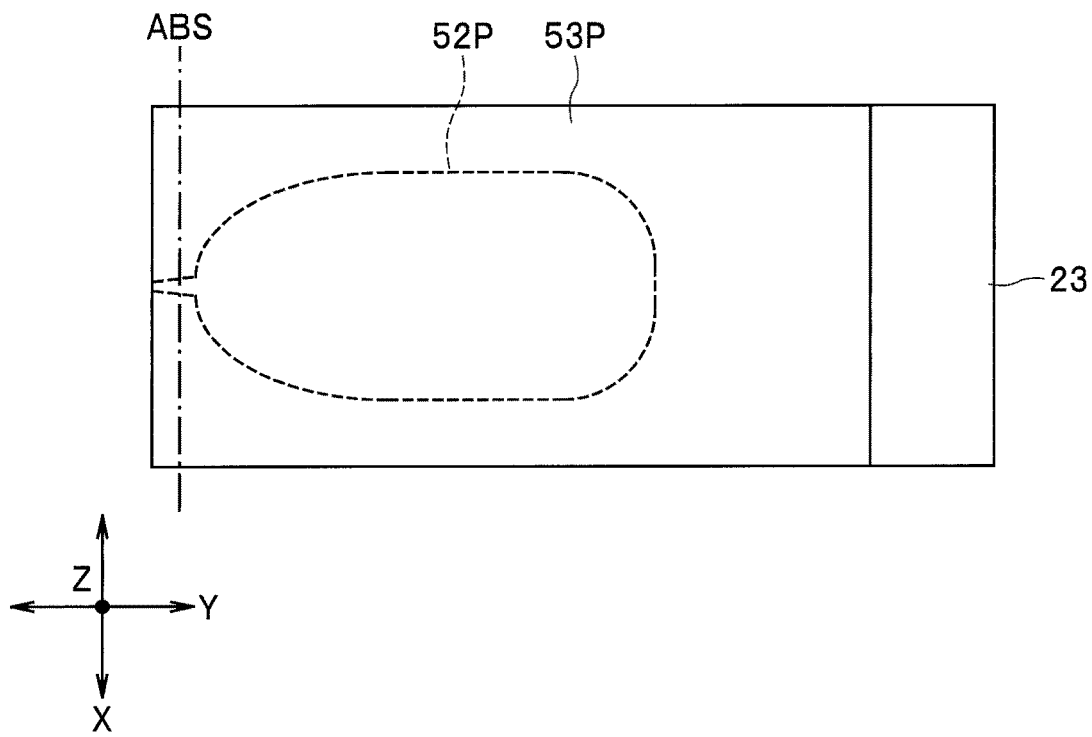
FIGS. 18A and 18B are explanatory diagrams showing a step of a manufacturing method for the thermally-assisted magnetic recording head according to the third embodiment of the invention.
Figure 18B:
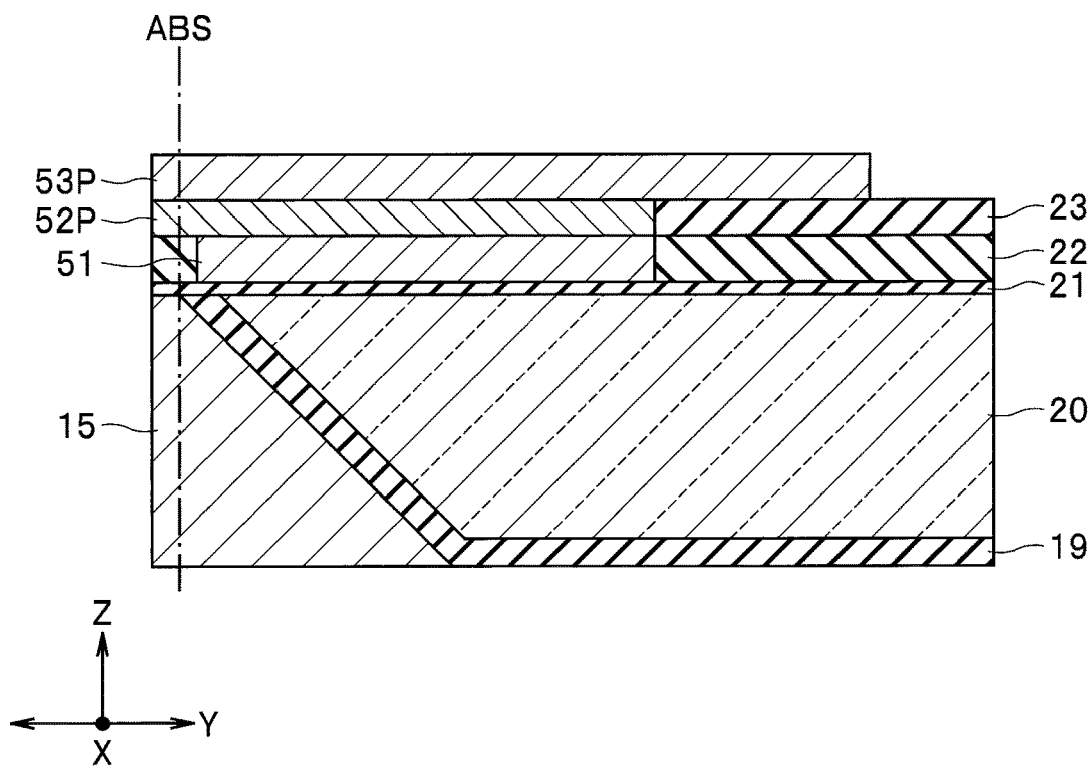

The manufacturing method for the thermally-assisted magnetic recording head 100 according to the present embodiment is the same as the method according to the first embodiment up to the step of polishing the dielectric layer 23 (see FIG. 8A and FIG. 8B). FIG. 18A and FIG. 18B show the next step. In this step, an initial heat sink 53P for eventually making the heat sink 53 is initially formed on the metal film 52P and the dielectric layer 23 by a lift-off method, for example.

Figure 19A:
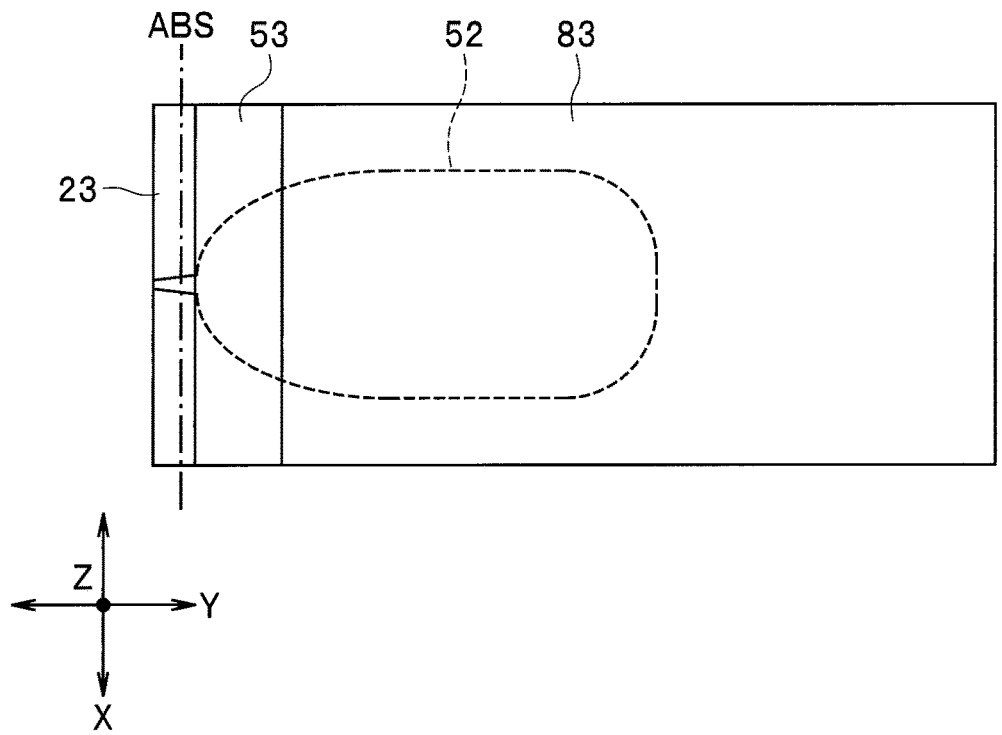
FIGS. 19A and 19B are explanatory diagrams showing a step that follows the step shown in FIGS. 18A and 18B.
Figure 19B:
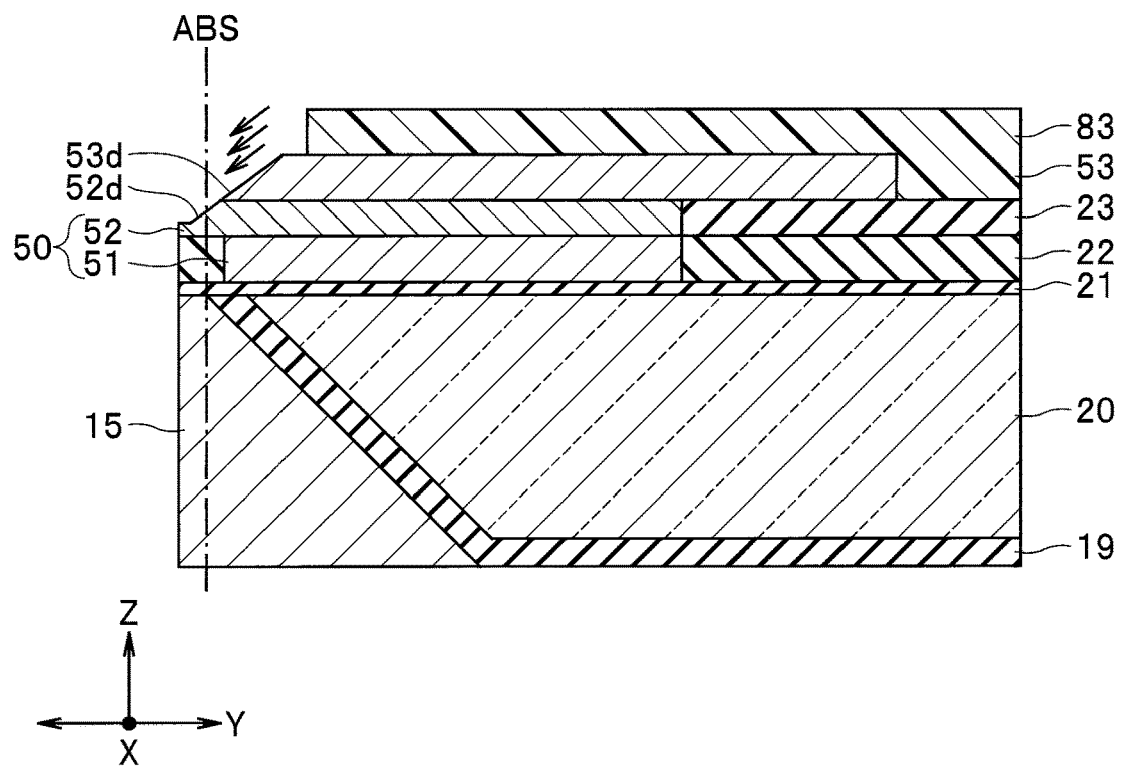

FIG. 19A and FIG. 19B show the next step. In this step, a photoresist mask 83 is initially formed on the initial heat sink 53P and the dielectric layer 23. The formation method for the photoresist mask 83 is the same as that for the photoresist mask 82 of the first embodiment. The photoresist mask 83 does not cover the portion of the initial heat sink 53P that eventually makes the inclined surface 53d of the heat sink 53.

Next, an etching step of taper etching the metal film 52P, the initial heat sink 53P, and the dielectric layer 23 is performed. This etching step is performed by using IBE, for example. In using IBE, the traveling direction of the ion beam is inclined relative to the top surface of the initial heat sink 53P. The arrows in FIG. 19B indicate the traveling direction of the ion beam.

The etching step includes a first etching step and a second etching step. The first etching step is a step of taper etching the metal film 52P so that the inclined portion 52d of the connecting surface of the second metal layer 52 is formed in the metal film 52P. The second etching step is a step of taper etching the initial heat sink 53P so that the inclined surface 53d of the heat sink 53 is formed on the initial heat sink 53P. The first etching step is performed continuously after the second etching step. The formation of the inclined portion 52d in the metal film 52P completes the second metal layer 52. The plasmon generator 50 is thereby completed. The formation of the inclined surface 53d on the initial heat sink 53P completes the heat sink 53. After the completion of the heat sink 53, the photoresist mask 83 is removed.

Figure 20A:
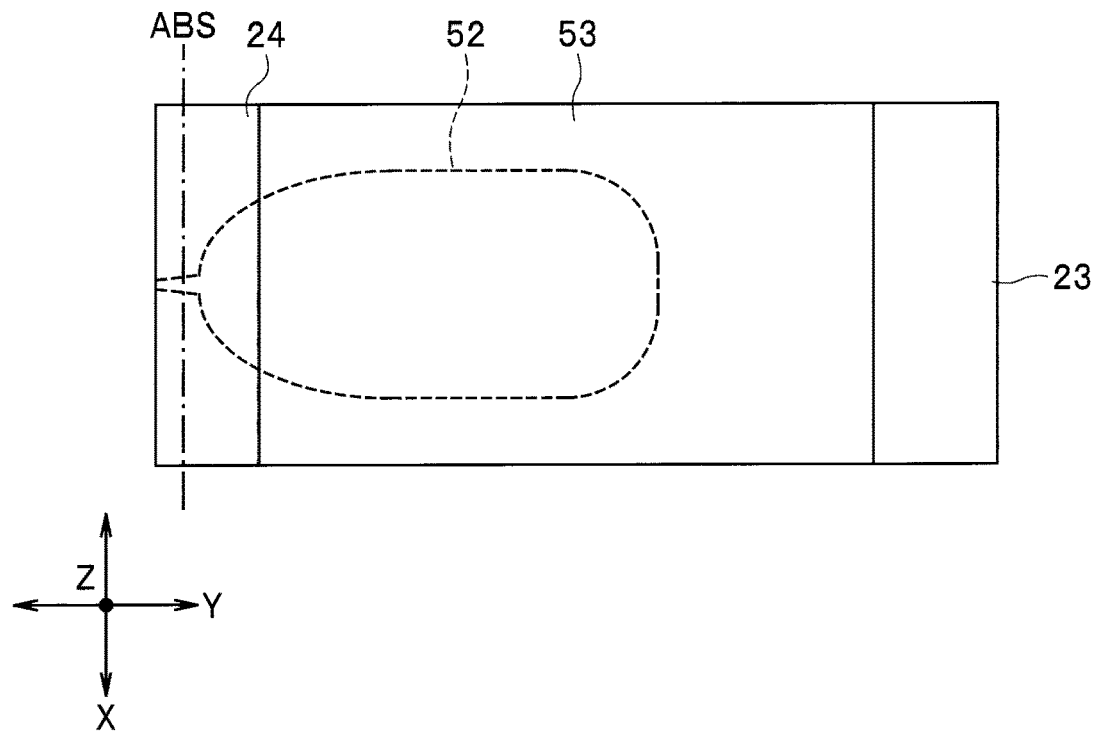
FIGS. 20A and 20B are explanatory diagrams showing a step that follows the step shown in FIGS. 19A and 19B.
Figure 20B:
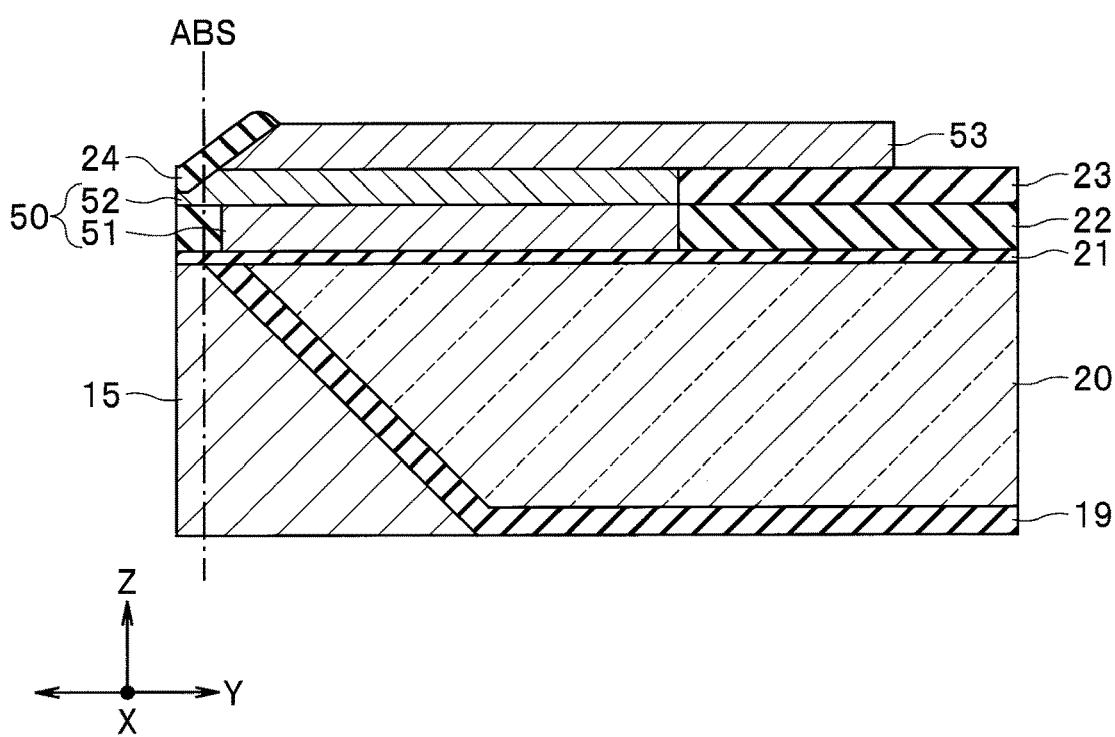

FIG. 20A and FIG. 20B show the next step. In this step, the dielectric layer 24 is initially formed on the entire top surface of the stack. Next, a portion of the dielectric layer 24 other than the location ABS where the medium facing surface 80 is to be formed or its vicinity is removed.

Figure 21:
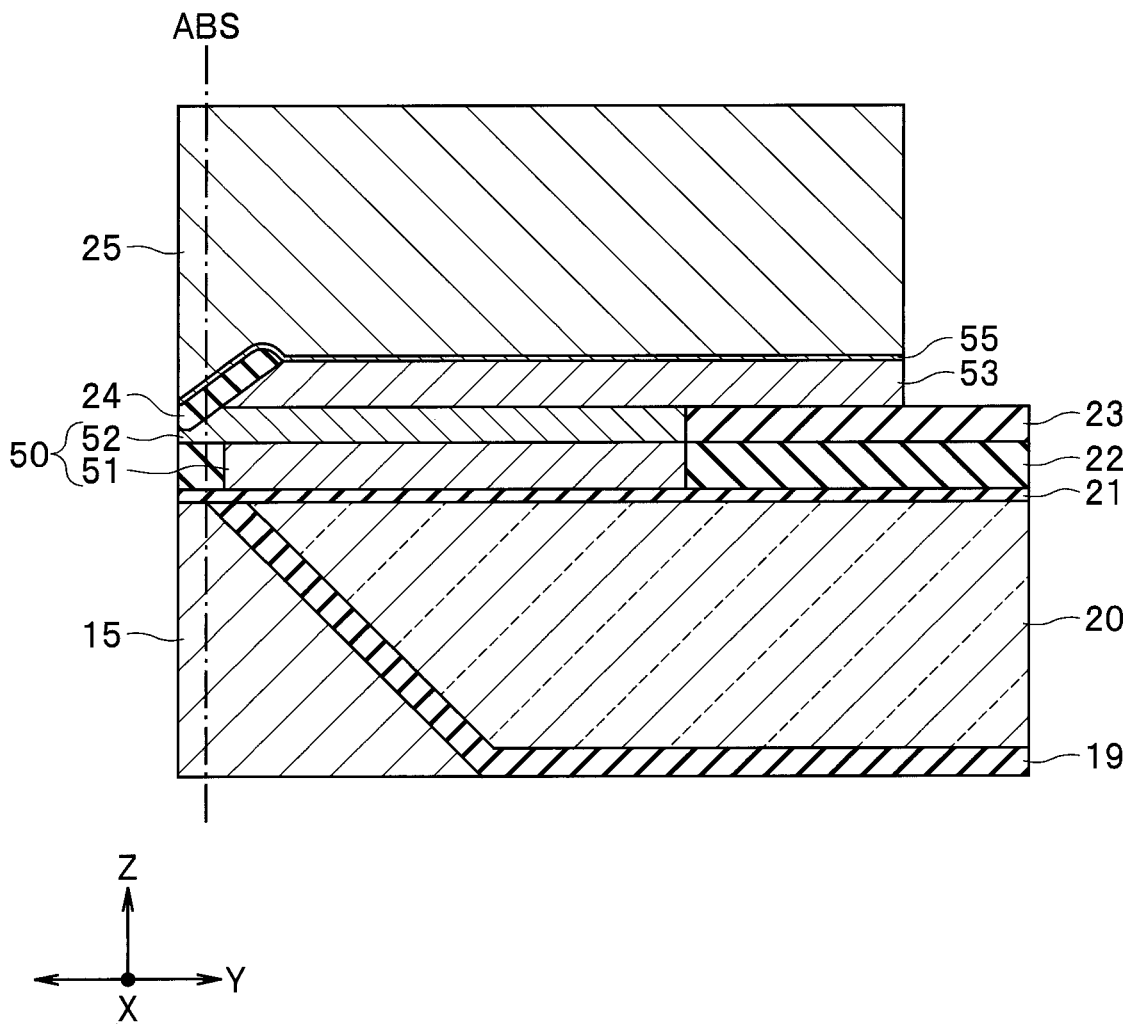
FIG. 21 is a cross-sectional view showing a step that follows the step shown in FIGS. 20A and 20B.

FIG. 21 shows the next step. In this step, the separating film 55 is initially formed on the dielectric layer 24 and the heat sink 53. Next, the main pole 25 and the coupling layer 26 are formed as in the step shown in FIG. 13 according to the first embodiment. The subsequent steps are the same as those of the first embodiment.

As described above, in the present embodiment, the first etching step is performed continuously after the second etching step. The inclined portion 52d of the connecting surface of the second metal layer 52 of the plasmon generator 50 is thereby formed to be continuous with the inclined surface 53d of the heat sink 53 in a self-aligned manner. The position of the rear end of the inclined portion 52d and the position of the second end of the inclined surface 53d are thereby determined in a self-aligned manner.

Modification Example

Figure 22:
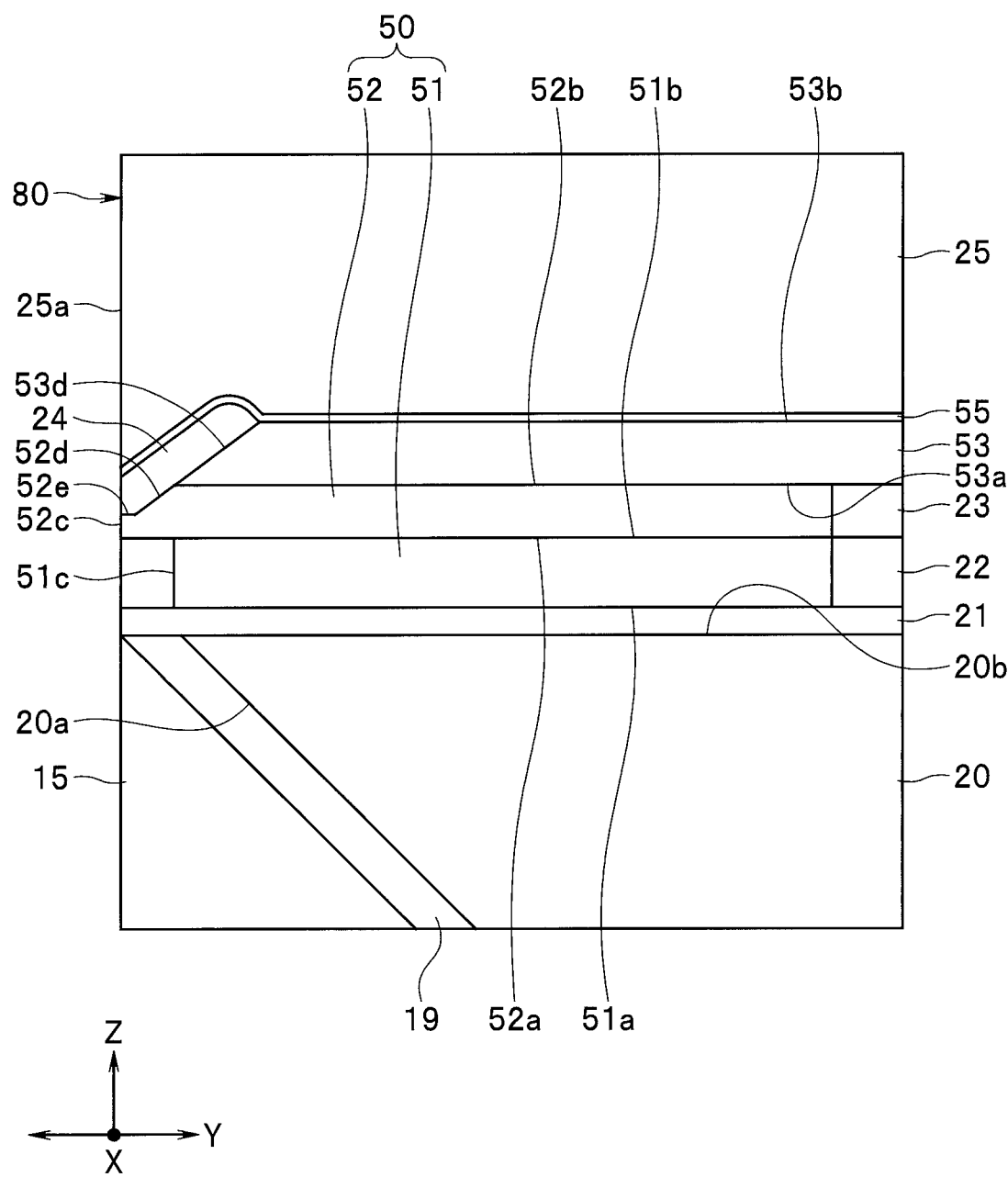
FIG. 22 is a cross-sectional view showing essential parts of a modification example of the magnetic head according to the third embodiment of the invention.

A modification example of the thermally-assisted magnetic recording head 100 according to the present embodiment will now be described. FIG. 22 is a cross-sectional view showing essential parts of the modification example of the thermally-assisted magnetic recording head 100. Details of the modification example of the present embodiment are the same as those of the modification example of the first embodiment. Specifically, in the modification example, the connecting surface of the second metal layer 52 of the plasmon generator 50 includes the extended portion 52e in addition to the inclined portion 52d. The extended portion 52e is located between the medium facing surface 80 and the inclined portion 52d.

The remainder of configuration, function and effects of the present embodiment are similar to those of the first embodiment.

Fourth Embodiment

Figure 23:
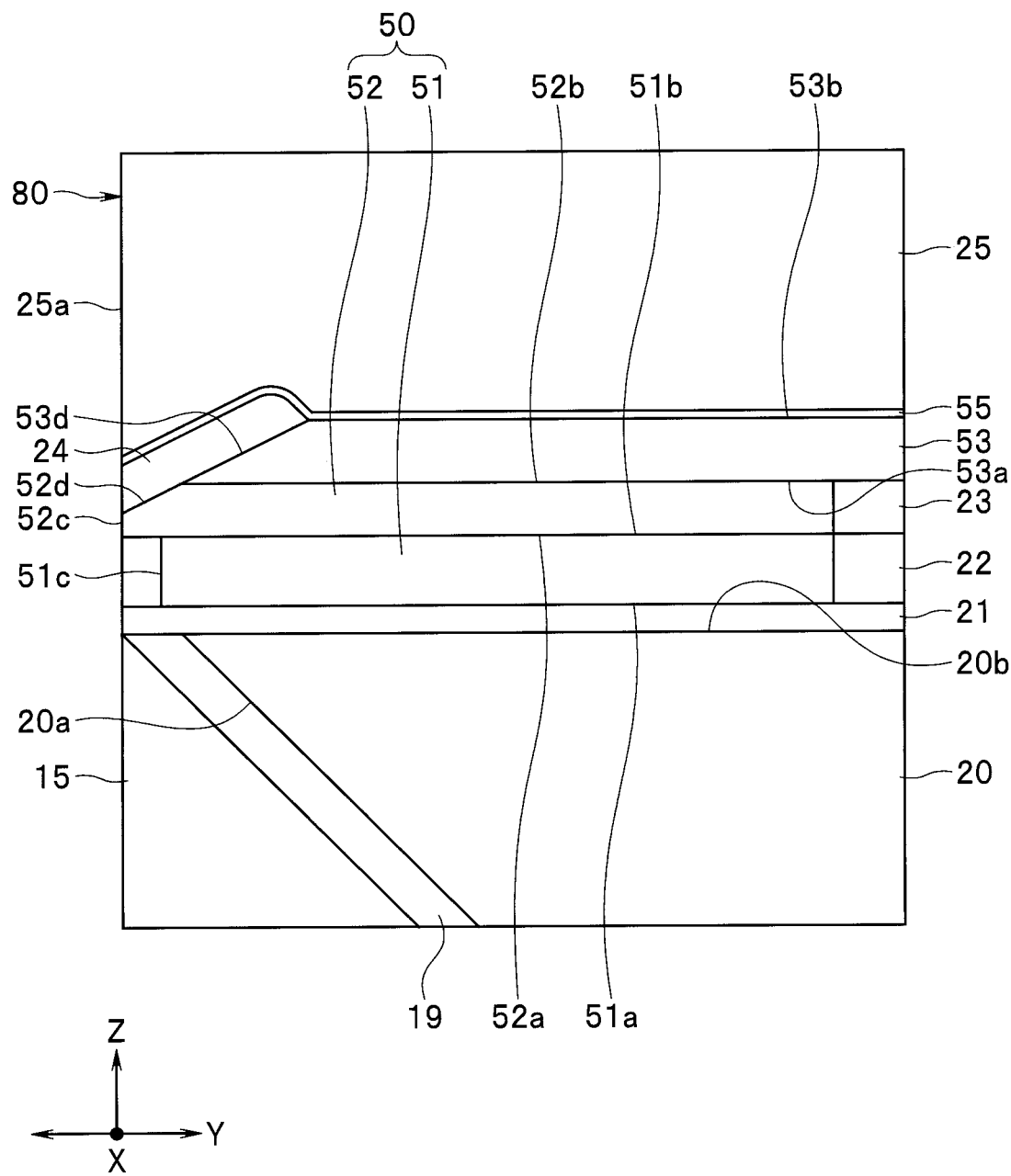
FIG. 23 is a cross-sectional view showing essential parts of a thermally-assisted magnetic recording head according to a fourth embodiment of the invention.

A fourth embodiment of the invention will now be described with reference to FIG. 23. FIG. 23 is a cross-sectional view showing essential parts of the thermally-assisted magnetic recording head according to the present embodiment.

The thermally-assisted magnetic recording head 100 according to the present embodiment is configured differently than in the third embodiment in the following ways. In the present embodiment, the second metal layer 52 of the plasmon generator 50 has a different shape than in the third embodiment. In the third embodiment, like the first embodiment, the rear end of the inclined portion 52d of the connecting surface of the second metal layer 52 is located at the border between the narrow portion 52A and the wide portion 52B of the second metal layer 52 (see FIG. 1). By contrast, in the present embodiment, like the second embodiment, the rear end is located in the wide portion 52B (see FIG. 15). The inclined portion 52d is formed to extend from the wide portion 52B to the narrow portion 52A.

In the example shown in FIG. 23, the second end of the inclined surface 53d of the heat sink 53 (the end closest to the medium facing surface 80) is located at a position farther from the medium facing surface 80 than the first end 51c of the first metal layer 51 (the end closest to the medium facing surface 80) is. In such a case, the effect from the fact that the distance from the medium facing surface 80 to the second end of the inclined surface 53d is less than or equal to the distance from the medium facing surface 80 to the first end 51c of the first metal layer 51, described in the third embodiment, is not available. However, also in the present embodiment, the distance from the medium facing surface 80 to the second end of the inclined surface 53d may be less than or equal to the distance from the medium facing surface 80 to the first end 51c of the first metal layer 51.

The remainder of configuration, function and effects of the present embodiment are similar to those of the third embodiment.

Fifth Embodiment

Figure 24:
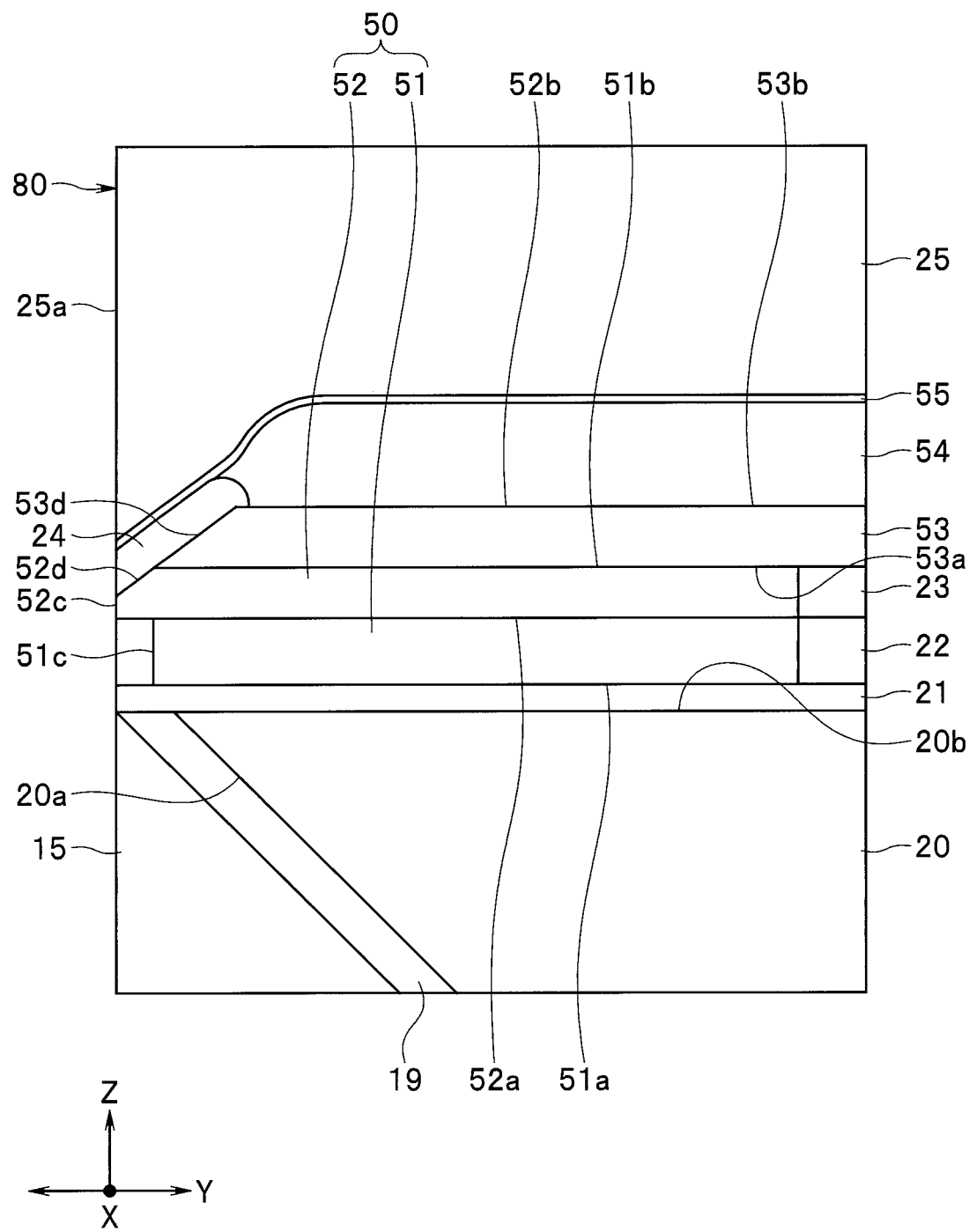
FIG. 24 is a cross-sectional view showing essential parts of a thermally-assisted magnetic recording head according to a fifth embodiment of the invention.

A fifth embodiment of the invention will now be described with reference to FIG. 24. FIG. 24 is a cross-sectional view showing essential parts of a thermally-assisted magnetic recording head according to the present embodiment.

The thermally-assisted magnetic recording head 100 according to the present embodiment is configured differently than in the third embodiment in the following ways. In the present embodiment, the thermally-assisted magnetic recording head 100 includes a heat sink 54 located on the heat sink 53. The heat sink 54 is in contact with the dielectric layer 24. In the present embodiment, the main pole 25 is located on the heat sink 54 and the dielectric layer 24. The separating film 55 is interposed between the main pole 25 and the heat sink 54.

The second metal layer 52 of the plasmon generator 50 of the present embodiment may have the same shape as that of the second metal layer 52 of the fourth embodiment. The remainder of configuration, function and effects of the present embodiment are similar to those of the third or fourth embodiment.

Sixth Embodiment

Figure 25:
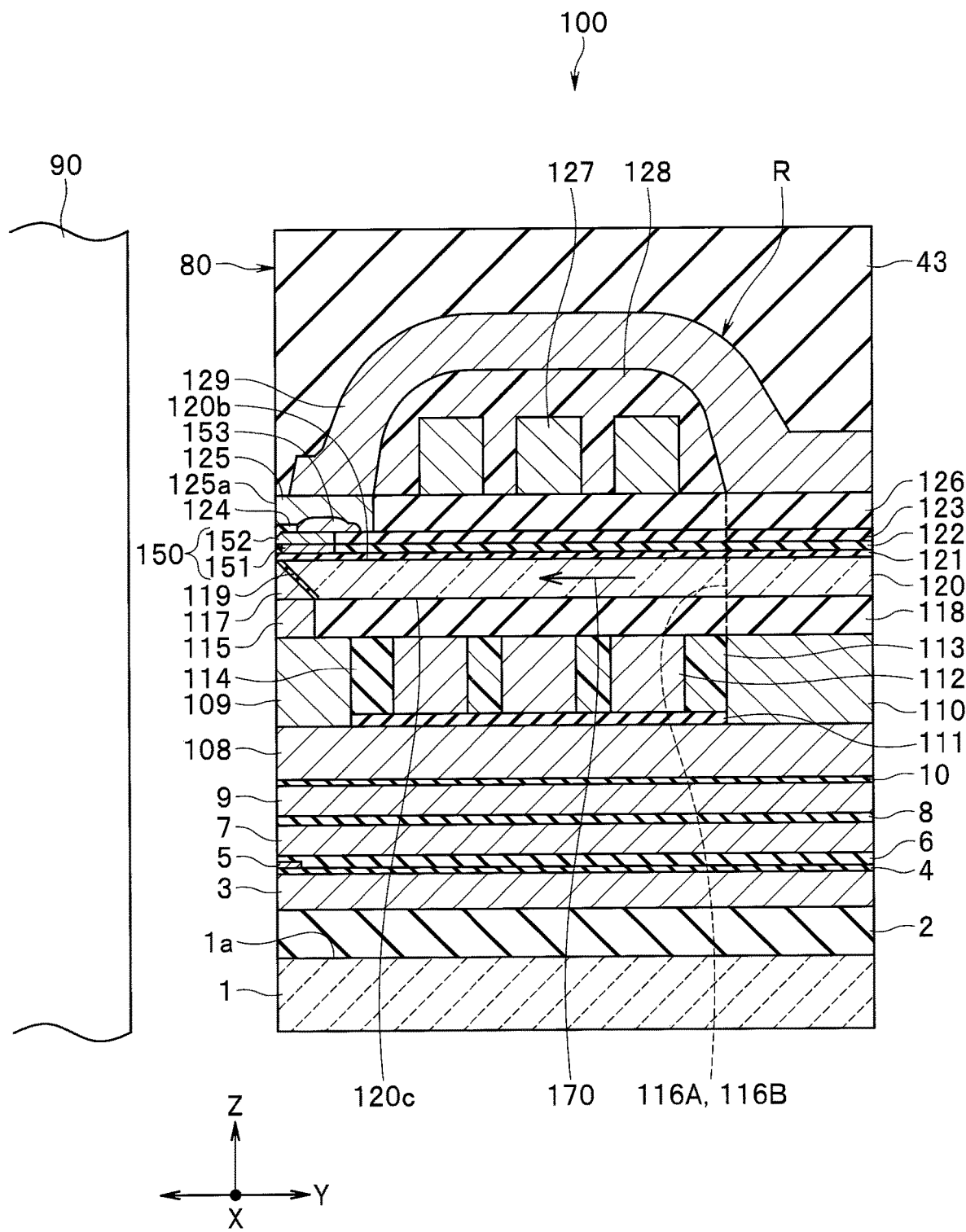
FIG. 25 is a cross-sectional view showing the configuration of a thermally-assisted magnetic recording head according to a sixth embodiment of the invention.
Figure 26:
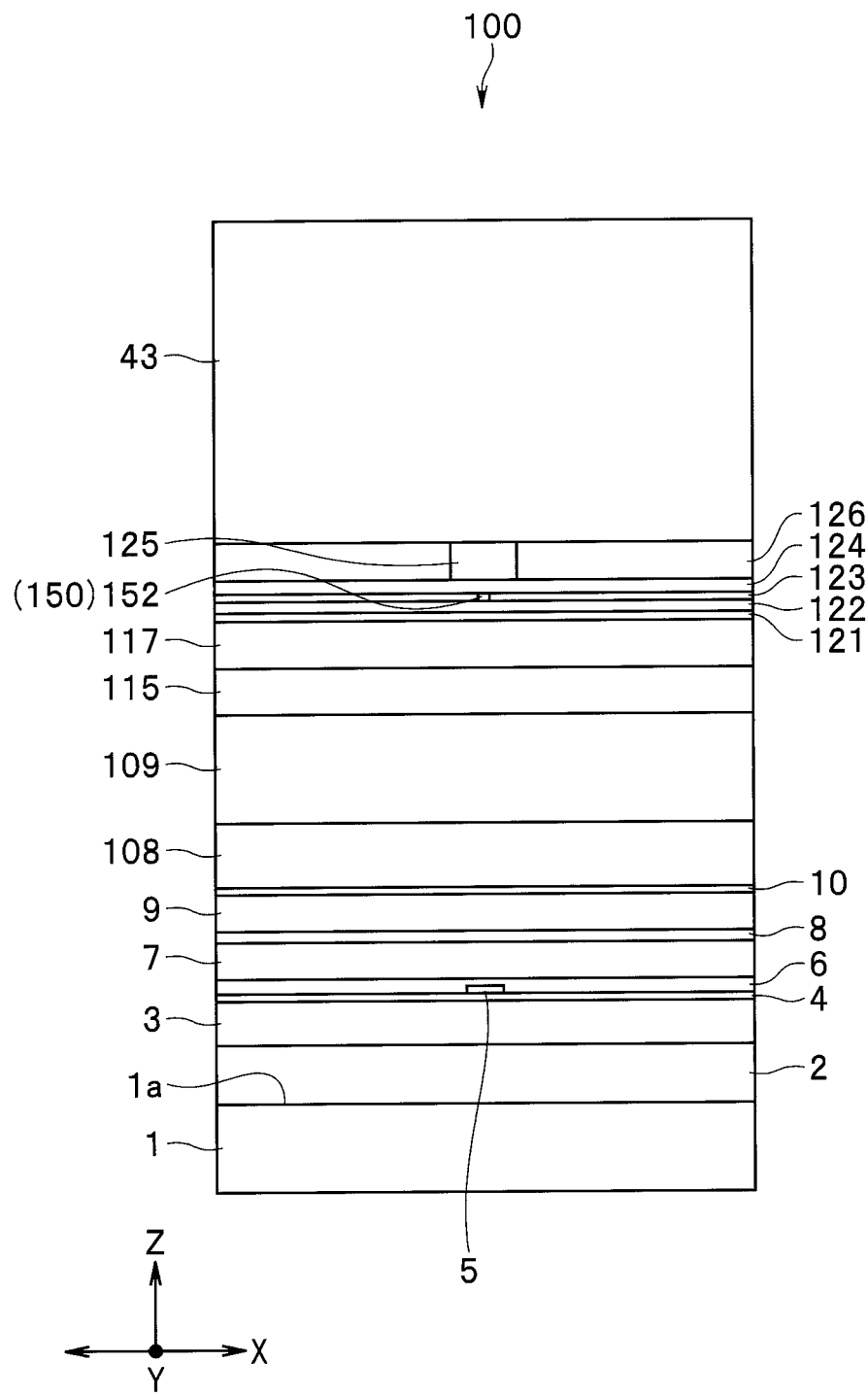
FIG. 26 is a front view showing the medium facing surface of the thermally-assisted magnetic recording head according to the sixth embodiment of the invention.

A sixth embodiment of the invention will now be described with reference to FIG. 25 and FIG. 26. FIG. 25 is a cross-sectional view showing the configuration of a thermally-assisted magnetic recording head according to the present embodiment. FIG. 26 is a front view showing the medium facing surface of the thermally-assisted magnetic recording head according to the present embodiment.

In the present embodiment, the recording head unit of the thermally-assisted magnetic recording head 100 has a different configuration than in the first embodiment. The recording head unit of the present embodiment includes coils 112 and 127 and a main pole 125 instead of the coil 30 and the main pole 25 of the first embodiment. The functions and materials of the coils 112 and 127 and the main pole 125 are the same as those of the coil 30 and the main pole 25 of the first embodiment. The main pole 125 has a front end face 125a located in the medium facing surface 80.

The recording head unit of the present embodiment also includes a shield 117 formed of a magnetic metal instead of the shield 15 of the first embodiment. The shield 117 has an end face located in the medium facing surface 80.

The return path section R of the present embodiment connects the main pole 125 and the shield 117 to each other, and passes a magnetic flux corresponding to the magnetic field produced by the coils 112 and 127. The return path section R includes a return pole layer 108, coupling layers 109, 110, and 115, two coupling sections 116A and 116B, and a yoke layer 129 instead of the return pole layer 11, the coupling layers 12, 13, 26, 28, 29, 36, and 37, the two coupling sections 16A and 16B, and the yoke layer 41 of the first embodiment. The return pole layer 108 lies on the nonmagnetic layer 10. The return pole layer 108 has an end face located in the medium facing surface 80.

The recording head unit of the present embodiment includes insulating layers 111, 113, 114, and 128, an unshown insulating layer, and dielectric layers 123, 124, and 126 instead of the plurality of insulating layers, the plurality of insulating films, and the plurality of dielectric layers of the first embodiment. The unshown insulating layer is located around the return pole layer 108. The unshown insulating layer is formed of alumina, for example.

The coupling layer 109 lies on a first portion of the top surface of the return pole layer 108, the first portion being near the medium facing surface 80. The coupling layer 110 lies on a second portion of the top surface of the return pole layer 108, the second portion being located away from the medium facing surface 80. The coupling layer 109 has an end face located in the medium facing surface 80. The insulating layer 111 is located on a portion of the top surface of the return pole layer 108 other than the first or second portion, and on the not-shown insulating layer. The insulating layer 111 is formed of alumina, for example.

The coil 112 lies on the insulating layer 111. The coil 112 is wound around the coupling layer 110. The insulating layer 113 is located between the windings of the coil 112. The insulating layer 114 is located around the coupling layer 109 and the coil 112. The insulating layer 113 is formed of photoresist, for example. The insulating layer 114 is formed of alumina, for example.

The coupling layer 115 lies on the coupling layer 109. Each of the coupling sections 116A and 116B has a first layer lying on the coupling layer 110, and a second and a third layer stacked in this order on the first layer. The first layer of the coupling section 116A and the first layer of the coupling section 116B are arranged to be adjacent in the track width direction (the X direction).

The waveguide of the present embodiment includes a core 120 instead of the core 20 of the first embodiment. The function and material of the core 120 are the same as those of the core 20 of the first embodiment. The core 120 has an end face facing toward the medium facing surface 80, an evanescent light generating surface 120b which is a top surface, a bottom surface 120c, and two side surfaces. The end face of the core 120 is inclined such that the distance between the medium facing surface 80 and the end face 20a decreases with increasing distance between the end face 20a and the top surface 1a of the substrate 1. In FIG. 25, the arrow denoted by the reference numeral 170 represents laser light propagating through the core 120 toward the medium facing surface 80.

The cladding of the waveguide of the present embodiment includes cladding layers 118, 119, 121, and 122 instead of the cladding layers 19, 21, and 22 of the first embodiment. The cladding layer 118 is located on the coupling layers 109 and 110, the coil 112, and the insulating layer 114, around the coupling layer 115. The first layers of the coupling sections 116A and 116B are embedded in the cladding layer 118.

The core 120 lies on the cladding layer 118. The cladding layer 119 is interposed between the shield 117 and the core 120. The surrounding cladding layer of the present embodiment lies on the cladding layer 118 and surrounds the core 120. The cladding layer 121 lies on the evanescent light generating surface 120b of the core 120 and the top surface of the surrounding cladding layer.

The second layers of the coupling sections 116A and 116B are embedded in the surrounding cladding layer. The second layer of the coupling section 116A and the second layer of the coupling section 116B are located on opposite sides of the core 120 in the direction of track width (the X direction) and spaced from the core 120.

The recording head unit of the present embodiment includes a plasmon generator 150 including a first metal layer 151 and a second metal layer 152, instead of the plasmon generator 50 of the first embodiment. The first metal layer 151 is located away from the medium facing surface 80. The second metal layer 152 has a front end face located in the medium facing surface 80. The shape, function, and material of the first metal layer 151 are the same as those of the first metal layer 51 of the first embodiment. The shape, function, and material of the second metal layer 152 are the same as those of the second metal layer 52 of the first embodiment.

The first metal layer 151 is located on the cladding layer 121. The cladding layer 122 is located on the cladding layer 121, around the first metal layer 151. The second metal layer 152 is located on the first metal layer 151 and the cladding layer 122.

The dielectric layer 123 is located on the cladding layer 122, around the second metal layer 152. The dielectric layer 124 is located on the second metal layer 152 and the dielectric layer 123, near the medium facing surface 80. The material of the dielectric layers 123 and 124 is the same as that of the dielectric layers 23 and 24 of the first embodiment.

The recording head unit of the present embodiment includes a heat sink 153 instead of the heat sink 53 of the first embodiment. The heat sink 153 is located on the second metal layer 152 and the dielectric layer 123 at a distance from the medium facing surface 80. The material of the heat sink 153 is the same as that of the heat sink 53 of the first embodiment.

The main pole 125 is located on the heat sink 153 and the dielectric layer 123. The dielectric layer 126 is located around the main pole 125. The third layers of the coupling sections 116A and 116B are embedded in the cladding layers 121 and 122 and the dielectric layers 123 and 126. The top surfaces of the third layers of the main pole 25, the dielectric layer 126, and the coupling sections 116A and 116B are even with each other. The material of the dielectric layer 126 is the same as that of the dielectric layer 27 of the first embodiment.

The coil 127 is located on the dielectric layer 126. The insulating layer 128 is located to cover the coil 127. The yoke layer 129 is located on the main pole 125, the coupling sections 116A and 116B, the dielectric layer 126, and the insulating layer 128. The coil 127 is wound around portions of the yoke layer 129 that are located on the coupling sections 116A and 116B. The coils 112 and 127 are connected in series or in parallel so that the magnetic flux corresponding to the magnetic field produced by the coil 112 and the magnetic flux corresponding to the magnetic field produced by the coil 127 flow in the same direction through the main pole 125. The insulating layer 128 is formed of photoresist, for example.

The first and second metal layers 151 and 152 of the plasmon generator 150 may have the same shape as that of the first and second metal layers 51 and 52 of any one of the second to fifth embodiments. If the first and second metal layers 151 and 152 have the same shape as that of the first and second metal layers 51 and 52 of any one of the third to fifth embodiments, the heat sink 153 may have the same shape as that of the heat sink 53 of any one of the third to fifth embodiments. The remainder of configuration, function and effects of the present embodiment are similar to those of any of the first to fifth embodiments.

The present invention is not limited to the foregoing embodiments, and various modifications may be made thereto. For example, the shapes and configurations of the plasmin generators 50 and 150 and the heat sinks 53 and 153 are not limited to the examples described in the embodiments, and may be freely set as far as the requirements set forth in the claims are satisfied.

Obviously, many modifications and variations of the present invention are possible in the light of the above teachings. Thus, it is to be understood that, within the scope of the appended claims and equivalents thereof, the invention may be practiced in other embodiments than the foregoing most preferable embodiments.

What is claimed is:

1. A thermally-assisted magnetic recording head comprising:
   a medium facing surface that faces a recording medium;
   a main pole that generates a write magnetic field for writing data on the recording medium;
   a waveguide including a core that propagates light and a cladding that is located around the core; and
   a plasmon generator, wherein
   the plasmon generator includes a first metal layer and a second metal layer,
   the first metal layer is formed of a first metal material, is located away from the medium facing surface, and includes a plasmon exciting portion on which a surface plasmon is excited on a basis of the light propagating through the core,
   the second metal layer is formed of a second metal material, is located on the first metal layer, and includes a bottom surface in contact with the first metal layer, a top surface located on a side opposite to the bottom surface, a front end face that is located in the medium facing surface and generates near-field light from the surface plasmon, and a connecting surface that connects the top surface and the front end face, and
   the connecting surface includes an inclined portion inclined relative to a direction perpendicular to the medium facing surface.

2. The thermally-assisted magnetic recording head according to claim 1, wherein:
   the core includes an evanescent light generating surface that generates evanescent light from the light propagating through the core;
   the plasmon exciting portion is opposed to the evanescent light generating surface at a predetermined distance; and
   in the first metal layer, the surface plasmon is excited on the plasmon exciting portion through coupling with the evanescent light.

3. The thermally-assisted magnetic recording head according to claim 1, wherein:
   the second metal layer includes a narrow portion including the front end face of the second metal layer, and a wide portion located farther from the medium facing surface than the narrow portion is; and
   the wide portion has a maximum width greater than a maximum width of the narrow portion in a track width direction.

4. The thermally-assisted magnetic recording head according to claim 1, further comprising a heat sink in contact with the top surface of the second metal layer at a position away from the medium facing surface.

5. The thermally-assisted magnetic recording head according to claim 4, wherein the heat sink includes an inclined surface inclined relative to the direction perpendicular to the medium facing surface, the inclined surface being continuous with the inclined portion of the connecting surface of the second metal layer.

6. The thermally-assisted magnetic recording head according to claim 5, wherein an angle that the inclined surface of the heat sink forms with the direction perpendicular to the medium facing surface is the same as an angle that the inclined portion of the connecting surface of the second metal layer forms with the direction perpendicular to the medium facing surface.

7. The thermally-assisted magnetic recording head according to claim 5, wherein:
the first metal layer includes a first end closest to the medium facing surface;
the inclined surface includes a second end closest to the medium facing surface; and
a distance from the medium facing surface to the second end of the inclined surface is less than or equal to a distance from the medium facing surface to the first end of the first metal layer.

8. A manufacturing method for the thermally-assisted magnetic recording head according to claim 1, the manufacturing method comprising:
a step of forming the main pole;
a step of forming the waveguide; and
a step of forming the plasmon generator, wherein
the step of forming the plasmon generator includes a step of forming the first metal layer and a step of forming the second metal layer, and
the step of forming the second metal layer includes a step of forming a metal film of the second metal material and a first etching step of taper etching the metal film so that the inclined portion of the connecting surface of the second metal layer is formed in the metal film.

9. The manufacturing method according to claim 8, wherein:
the thermally-assisted magnetic recording head further includes a heat sink in contact with the top surface of the second metal layer at a position away from the medium facing surface; and
the manufacturing method further comprises a step of forming the heat sink.

10. The manufacturing method according to claim 9, wherein:
the heat sink includes an inclined surface inclined relative to the direction perpendicular to the medium facing surface;
the step of forming the heat sink includes a step of forming an initial heat sink for eventually making the heat sink on the metal film and a second etching step of taper etching the initial heat sink so that the inclined surface of the heat sink is formed on the initial heat sink; and
the first etching step is performed continuously after the second etching step.

11. The manufacturing method according to claim 10, wherein the first and second etching steps are performed by using ion beam etching.

* * * * *